United States Patent
Frenken et al.

(10) Patent No.: US 11,684,984 B2
(45) Date of Patent: Jun. 27, 2023

(54) TOOL FOR CUTTING A WORKPIECE

(71) Applicant: GUSTAV KLAUKE GMBH, Remscheid (DE)

(72) Inventors: Egbert Frenken, Heinsberg (DE); Andreas Lehr, Neuss (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 340 days.

(21) Appl. No.: 16/631,668

(22) PCT Filed: Jul. 17, 2018

(86) PCT No.: PCT/EP2018/069365
§ 371 (c)(1),
(2) Date: Jan. 16, 2020

(87) PCT Pub. No.: WO2019/016194
PCT Pub. Date: Jan. 24, 2019

(65) Prior Publication Data
US 2020/0180049 A1    Jun. 11, 2020

(30) Foreign Application Priority Data
Jul. 17, 2017  (DE) .................... 10 2017 116 041.8

(51) Int. Cl.
  *B23D 35/00*  (2006.01)
  *B23D 29/00*  (2006.01)
  (Continued)

(52) U.S. Cl.
CPC .......... *B23D 35/001* (2013.01); *B23D 29/00* (2013.01); *B23D 17/00* (2013.01); *B26D 3/16* (2013.01);
  (Continued)

(58) Field of Classification Search
CPC ...... B21D 37/06; B23D 35/00; B23D 35/001; B23D 35/002; B23D 35/008; B23D 29/00;
  (Continued)

(56) References Cited

U.S. PATENT DOCUMENTS 2,248,642 A    7/1941  Phillips
3,056,267 A   10/1962  McRee
  (Continued)

FOREIGN PATENT DOCUMENTS

DE    9002885 U1   7/1990
EP    0145456 A2   6/1985
  (Continued)

OTHER PUBLICATIONS

International Preliminary Report on Patenability for International Patent Application No. PCT/EP2018/069365 dated Dec. 3, 2019, 8 pages.
  (Continued)

*Primary Examiner* — Evan H MacFarlane
(74) *Attorney, Agent, or Firm* — Klintworth & Rozenblat IP LLP

(57) ABSTRACT

A tool configured to cut a workpiece includes a tool head which has a receiving contour in which the workpiece is received, and a movable cutting edge with a cutting contour. In the course of a cutting process, the cutting edge passes through the receiving contour. The cutting edge is subjected to the effect of an advancement part and can be moved to such an extent in the cutting direction(s) that it can pass all the way through the workpiece. In an embodiment, a position of the cutting edge reached after the cutting edge has passed all the way through the workpiece, the cutting edge, with removal from the advancement part, can be moved out from the cutting direction(s).

36 Claims, 31 Drawing Sheets

(51) Int. Cl.
  *B23D 17/00* (2006.01)
  *B26D 3/16* (2006.01)
  *B26D 1/00* (2006.01)
  *B26D 7/01* (2006.01)
(52) U.S. Cl.
  CPC ............... *B26D 2001/006* (2013.01); *B26D 2001/0053* (2013.01); *B26D 2007/013* (2013.01)
(58) Field of Classification Search
  CPC .... B23D 29/002; B23D 29/02; B23D 29/023; B23D 3/16; B23D 3/169; B23D 15/04; B23D 15/14; B23D 23/00; B23D 21/00; B23D 21/06
  See application file for complete search history.

(56) References Cited

U.S. PATENT DOCUMENTS

| | | | |
|---|---|---|---|
| 3,676,929 A * | 7/1972 | Nicholson | A01K 17/00 30/228 |
| 3,848,334 A | 11/1974 | Mattera | |
| 3,919,877 A * | 11/1975 | Netta | H01R 43/042 72/413 |
| 3,922,780 A | 12/1975 | Green | |
| 4,158,914 A | 6/1979 | Kurtz | |
| 4,292,833 A * | 10/1981 | Lapp | H02G 1/00 72/416 |
| 5,237,899 A | 8/1993 | Schartinger | |
| 5,890,291 A | 4/1999 | Crum | |
| 6,230,542 B1 | 5/2001 | Frenken | |
| 6,532,790 B2 * | 3/2003 | Frenken | B23D 23/00 72/409.16 |
| 6,792,789 B1 * | 9/2004 | Faucher | B21D 39/048 72/416 |
| 8,056,473 B2 | 11/2011 | Frenken | |
| 10,279,402 B2 * | 5/2019 | Frenken | B23D 29/002 |
| 10,967,442 B2 * | 4/2021 | D-Antuono | B23D 35/002 |

FOREIGN PATENT DOCUMENTS

| | | | |
|---|---|---|---|
| EP | 0827815 A1 | 9/1997 | |
| EP | 2447019 A2 | 5/2012 | |
| JP | 58211817 A * | 12/1983 | ............ B23D 23/00 |
| WO | 2005/108026 A1 | 11/2005 | |
| WO | 2008/002467 A2 | 1/2008 | |
| WO | 2008/138987 A2 | 11/2008 | |
| WO | 2016/112153 A2 | 7/2016 | |

OTHER PUBLICATIONS

International Search Report for International Patent Application No. PCT/EP2018/069365 dated Feb. 18, 2019, 11 pages.
Written Opinion for International Patent Application No. PCT/EP2018/069365 dated Feb. 18, 2019, 44 pages.
English machine translation of WO 2005/108026 A1.
English machine translation of DE 9002885 U1.

* cited by examiner

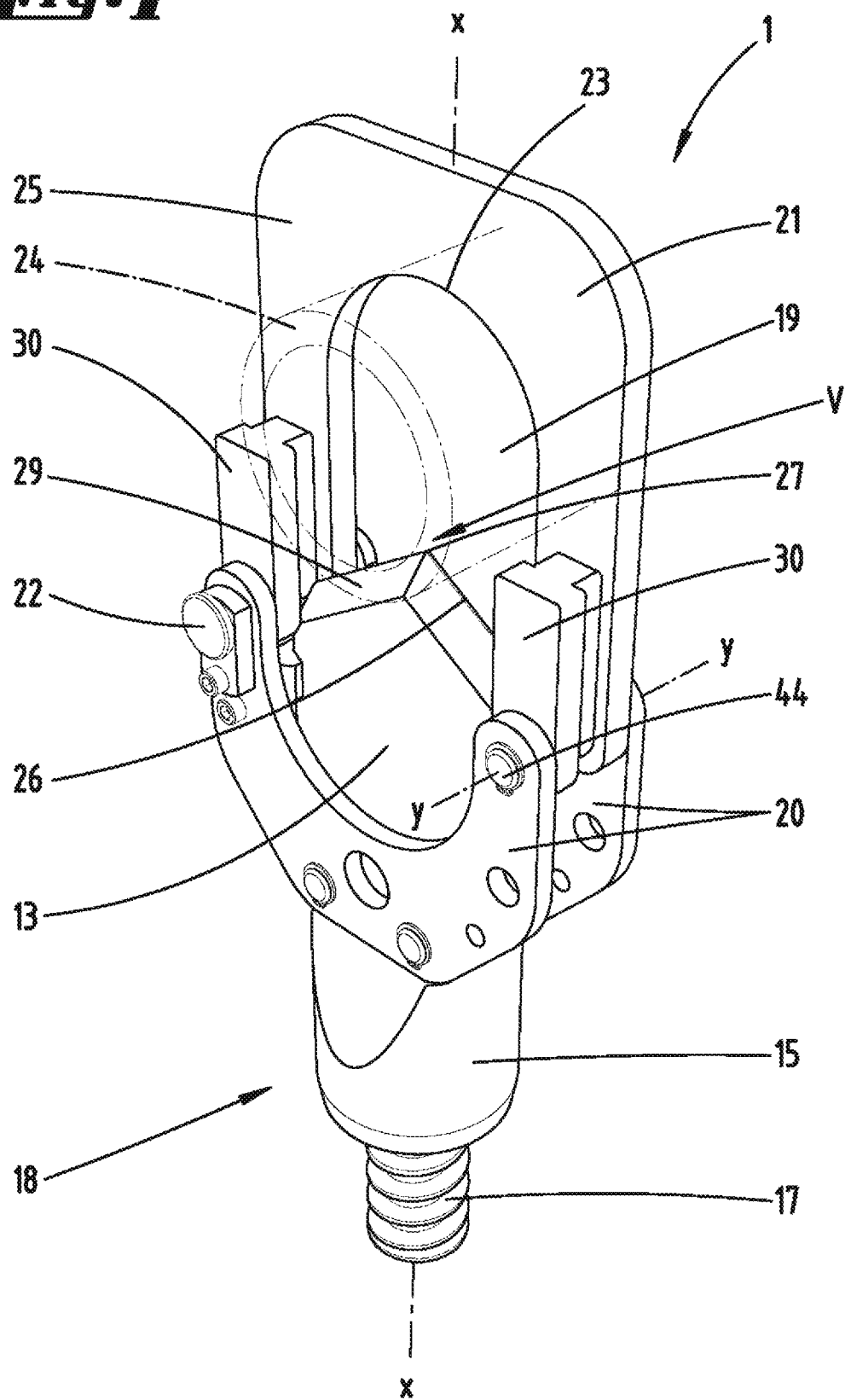

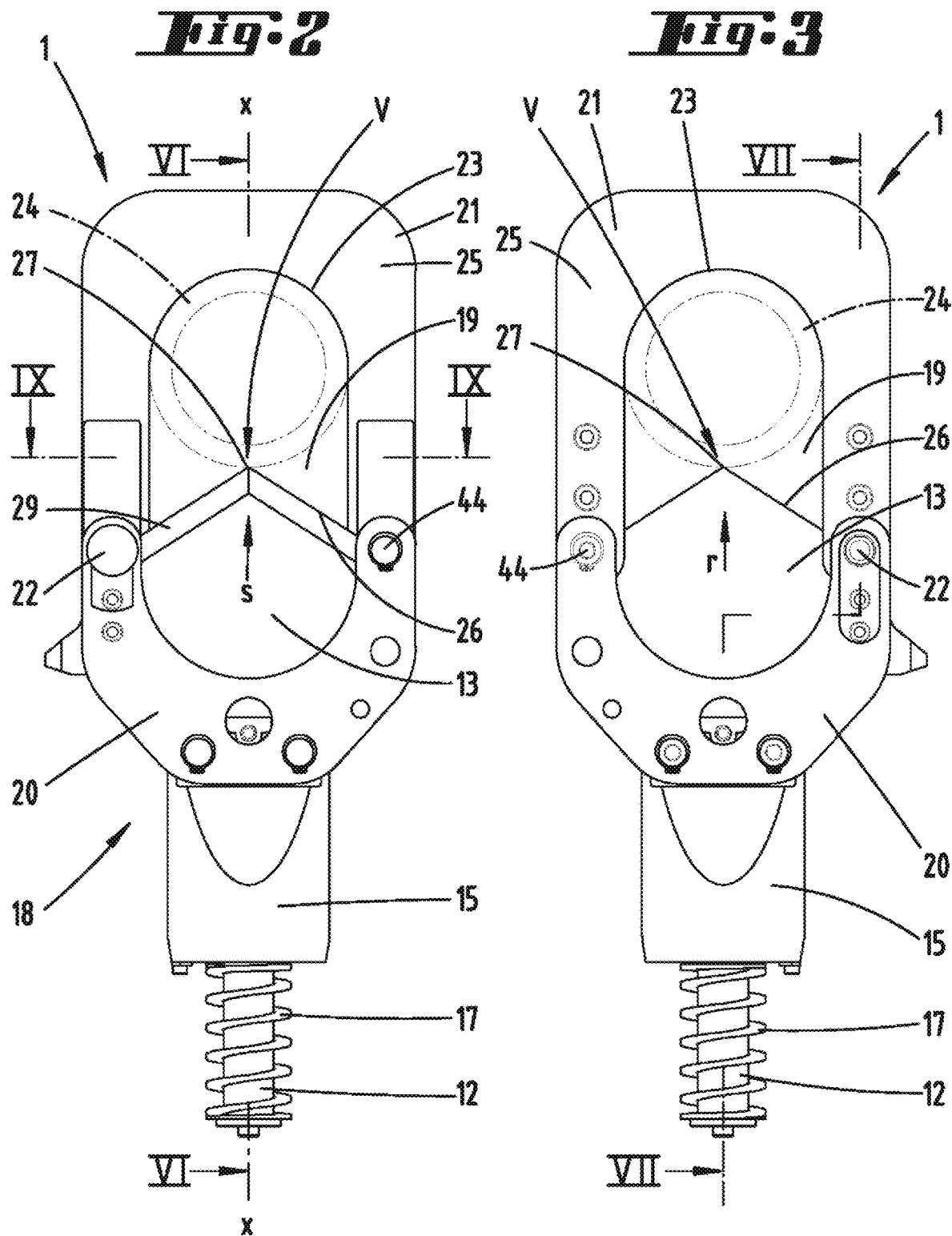

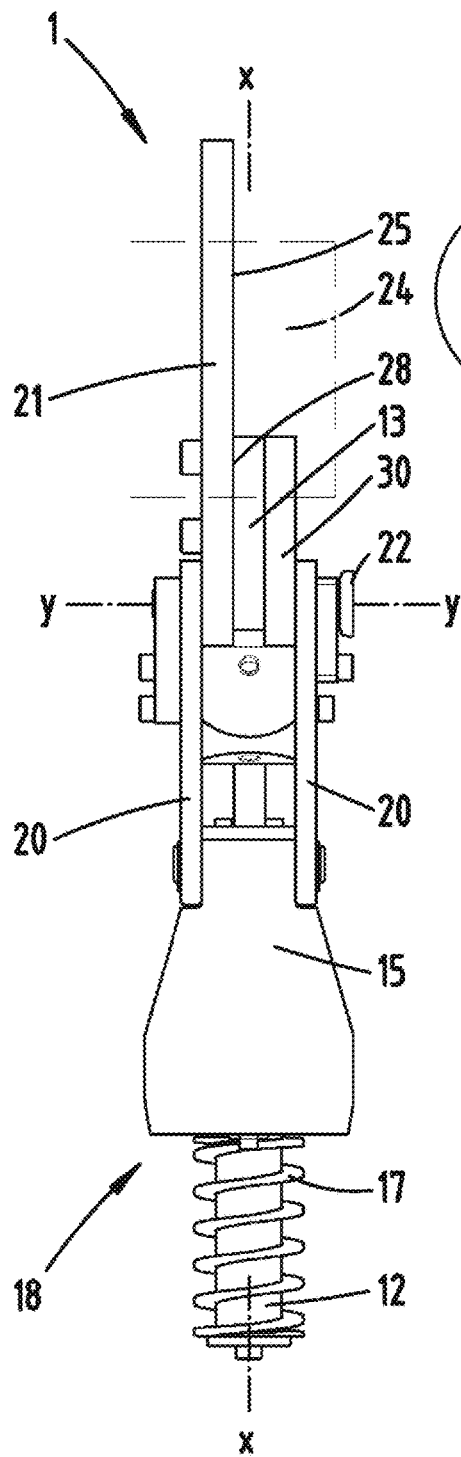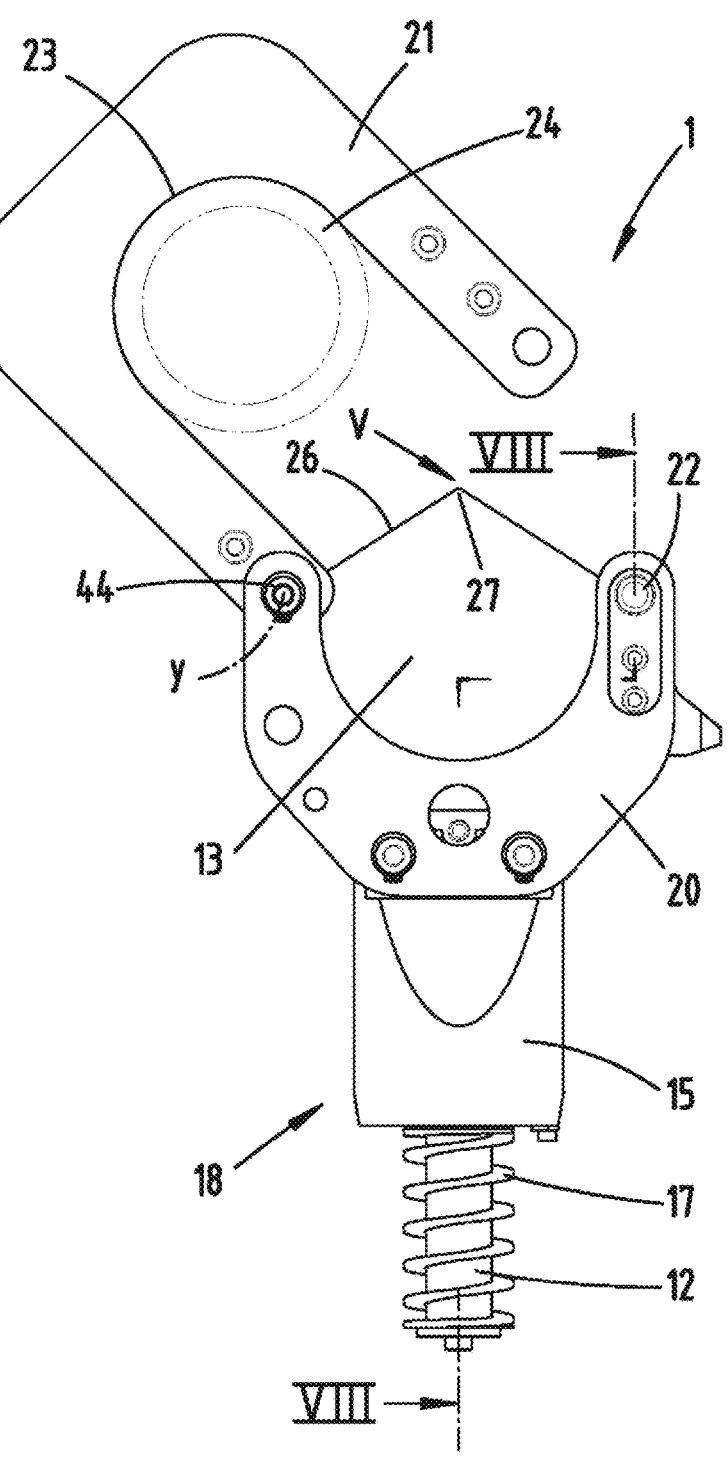

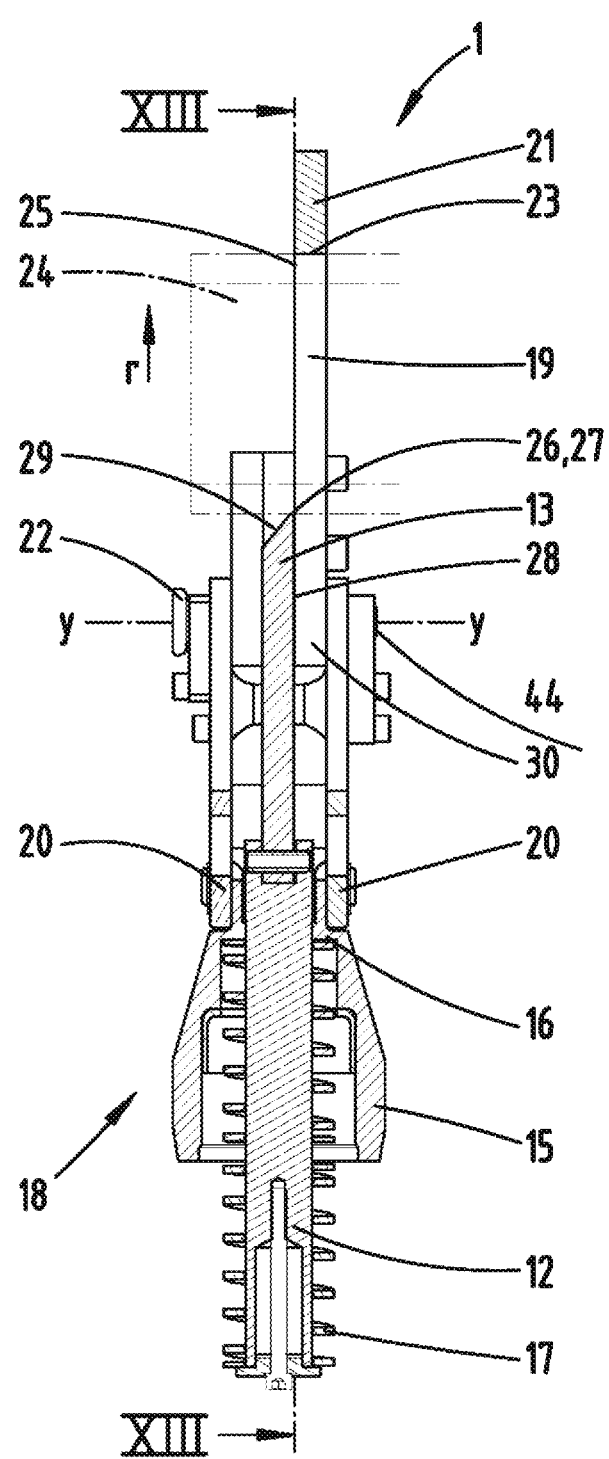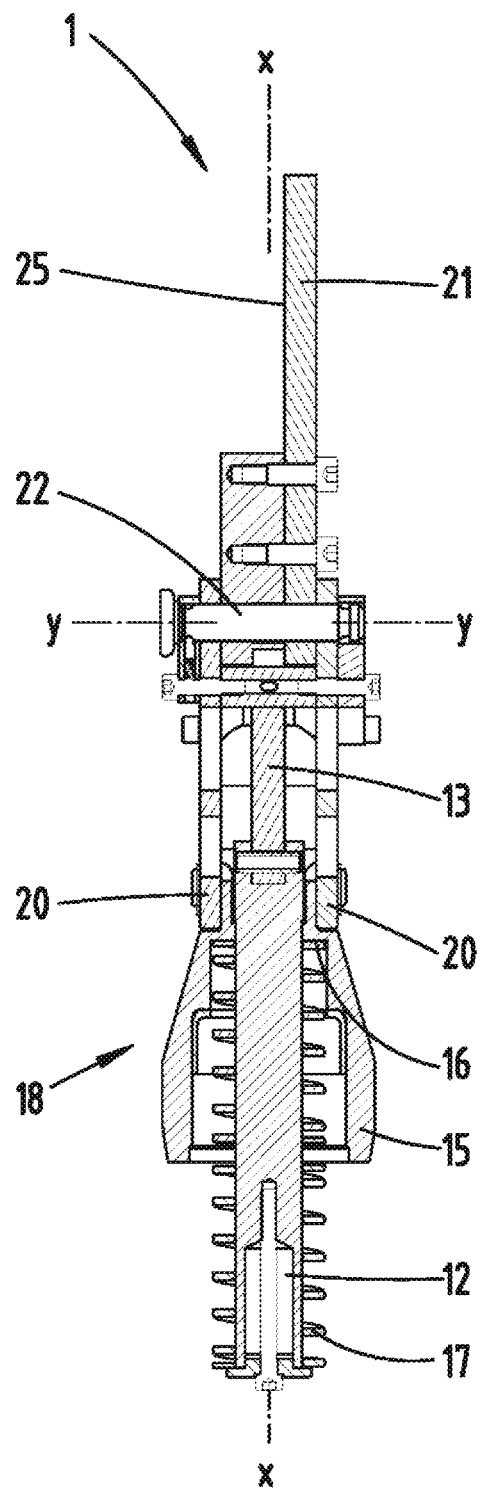

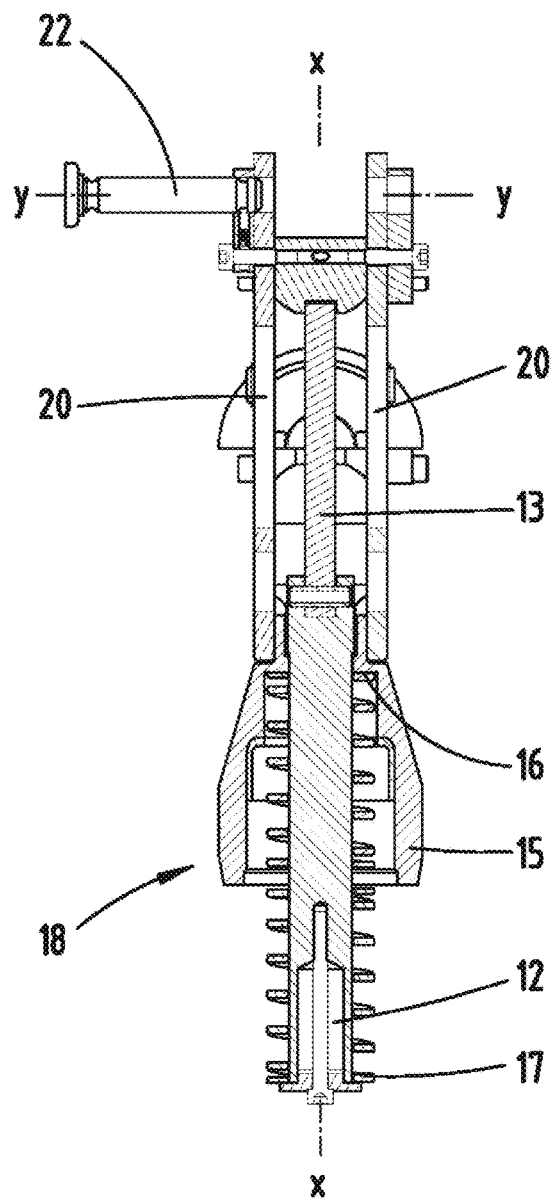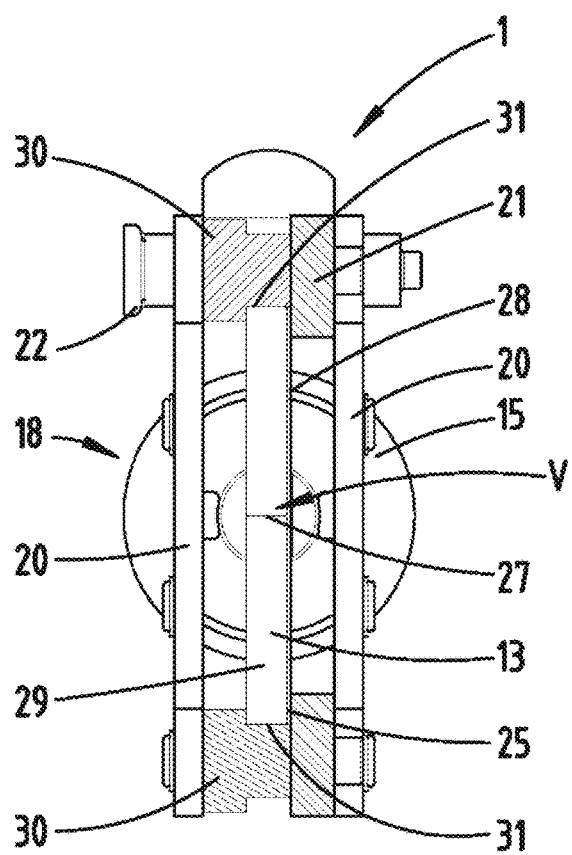

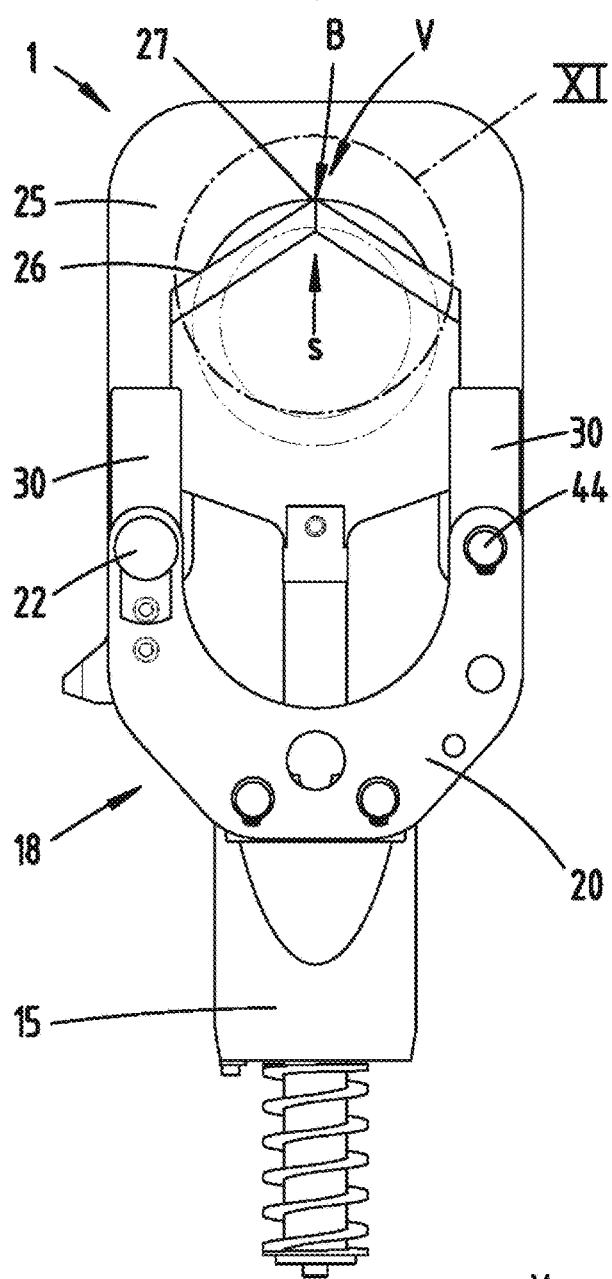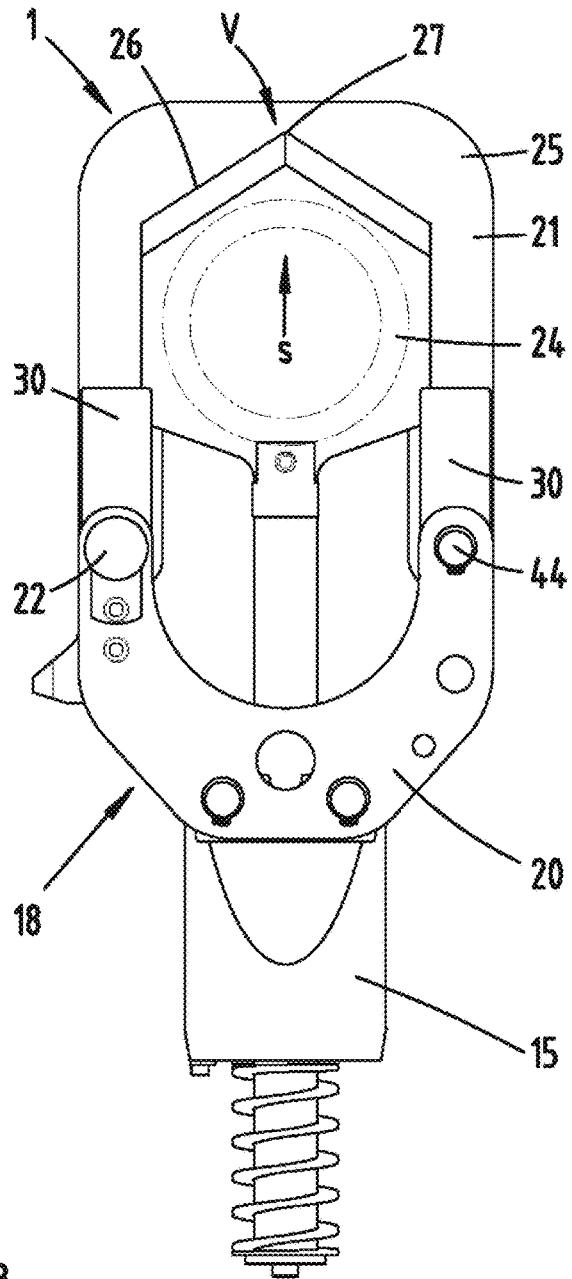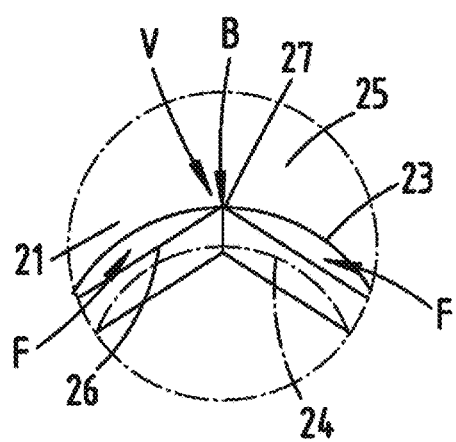

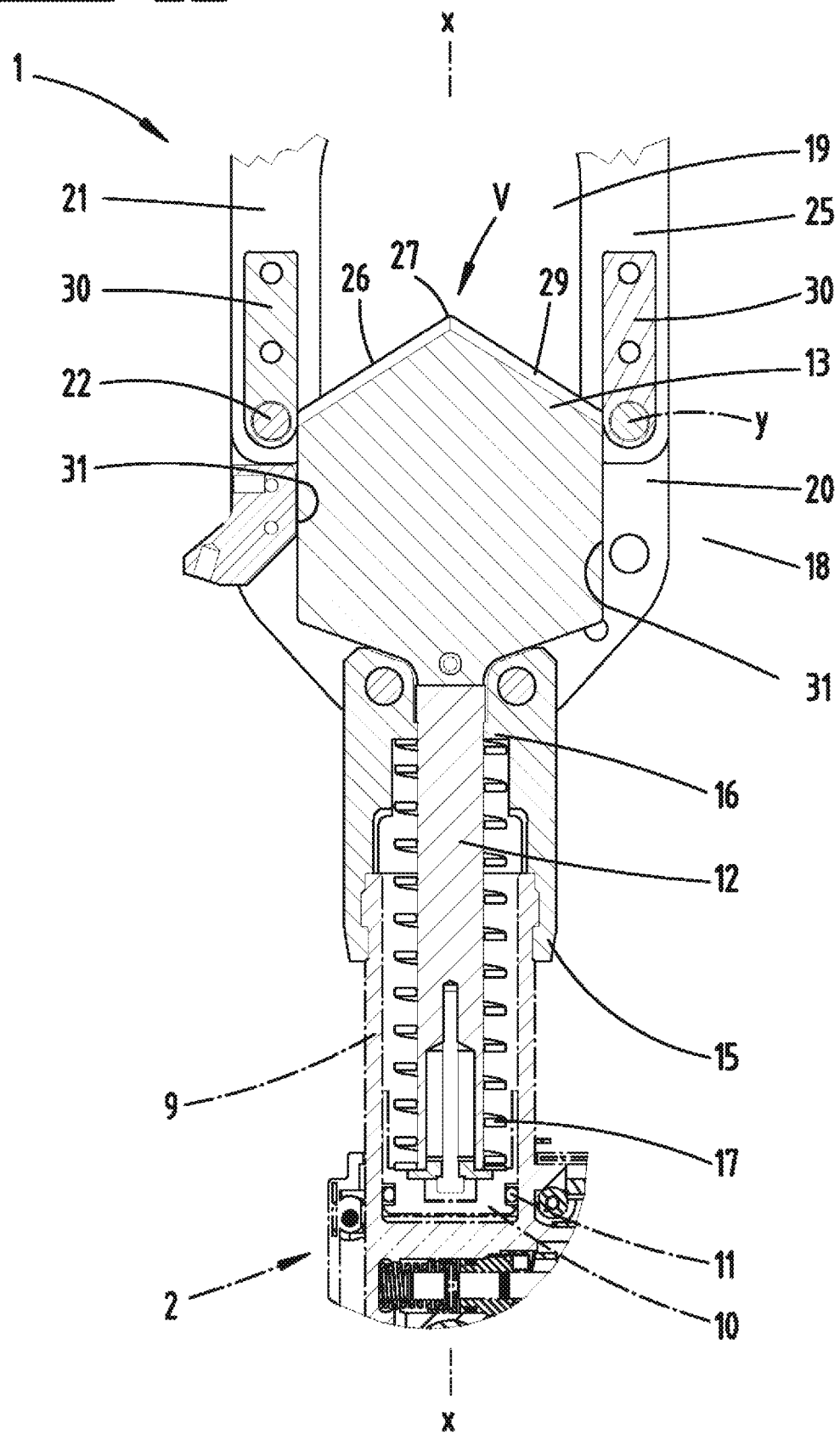

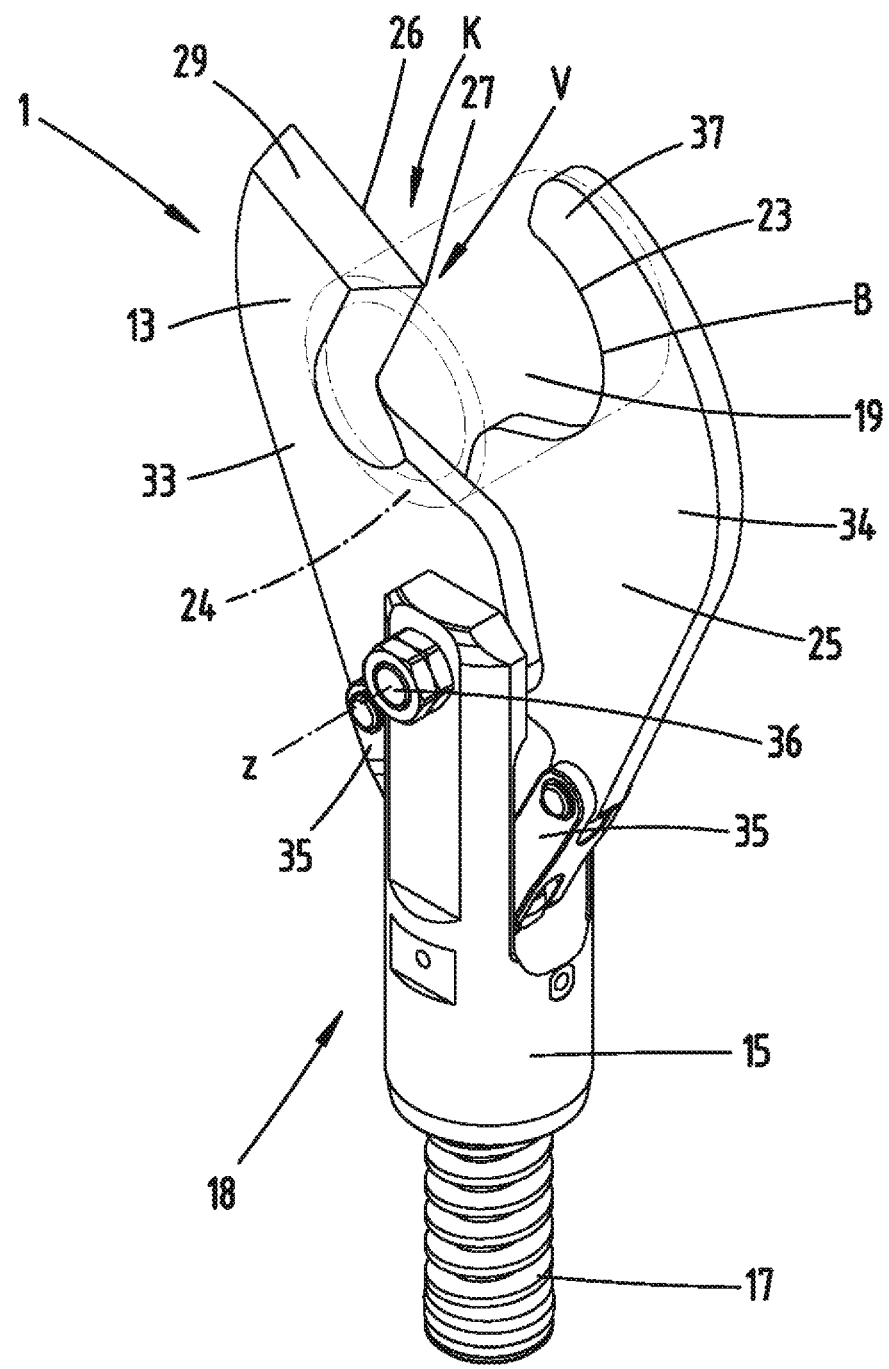

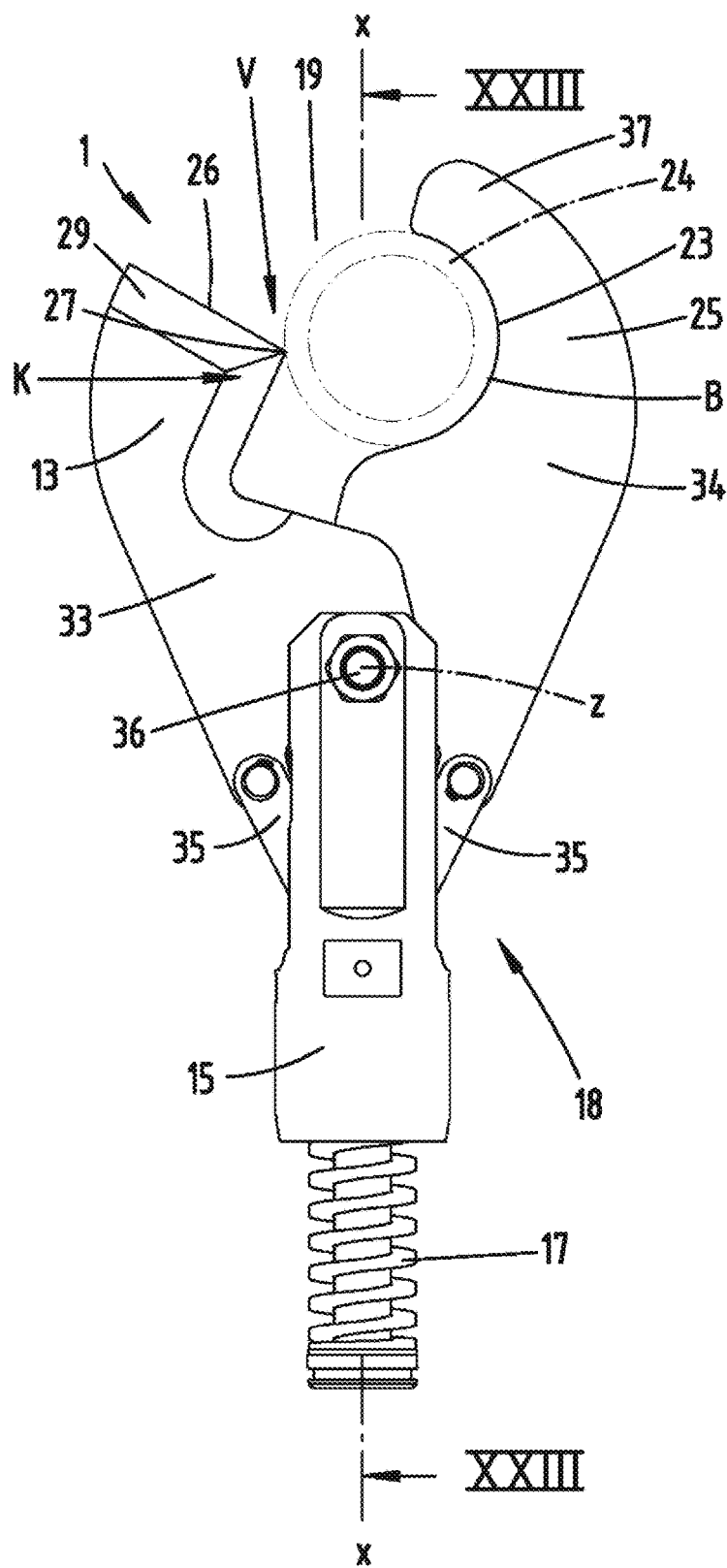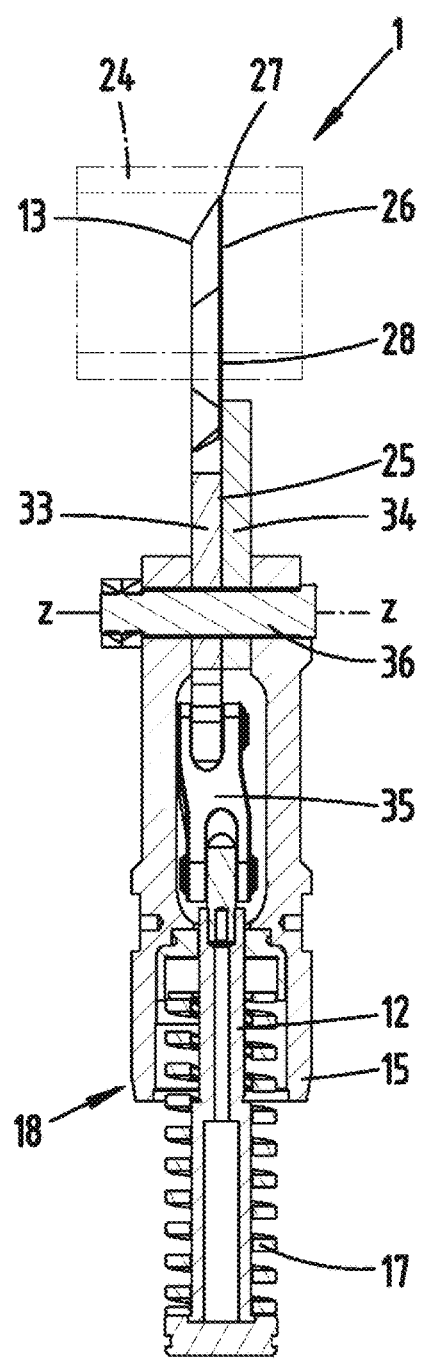

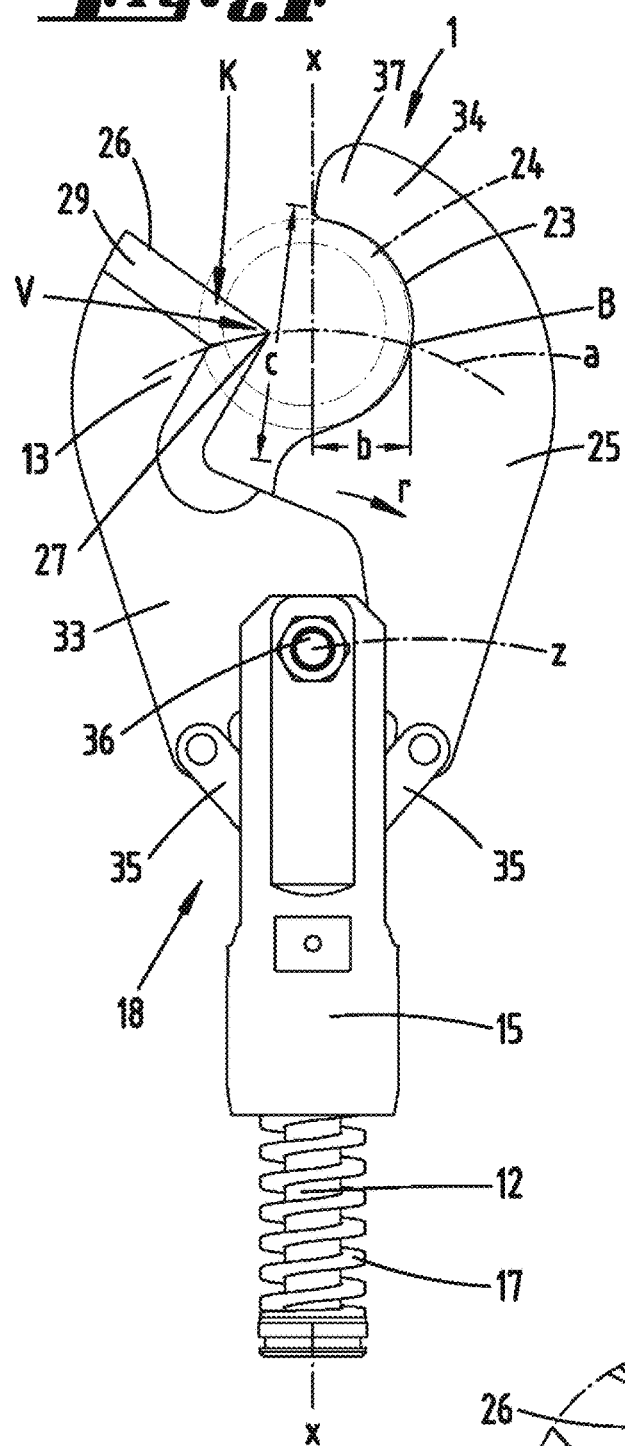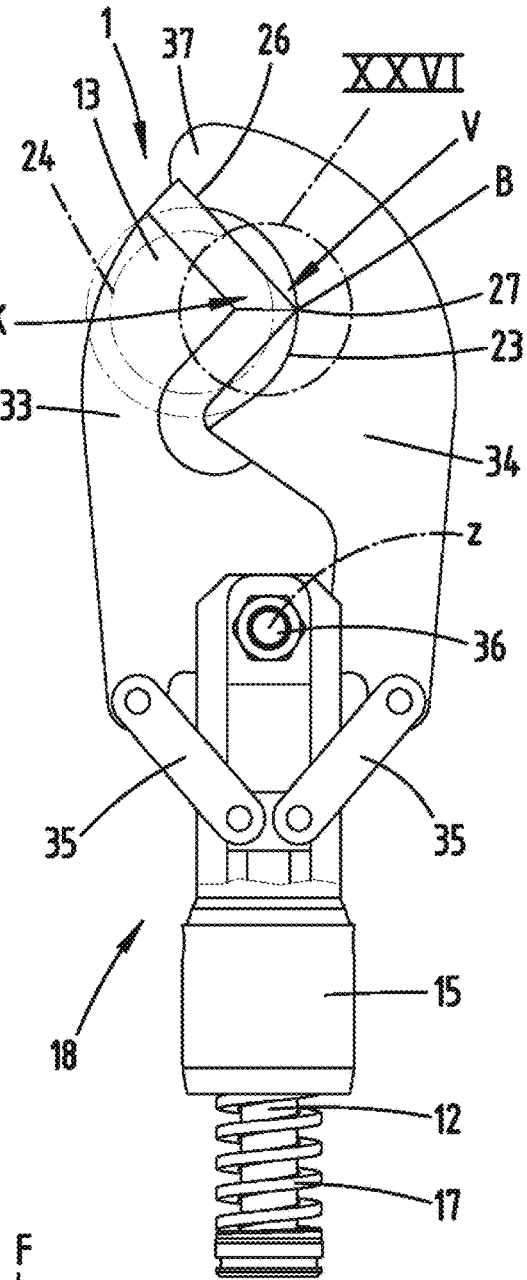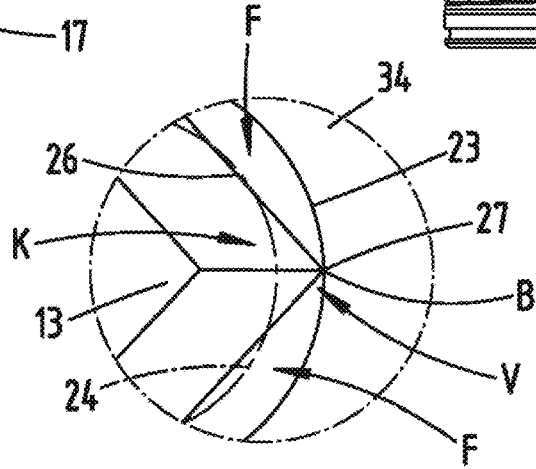

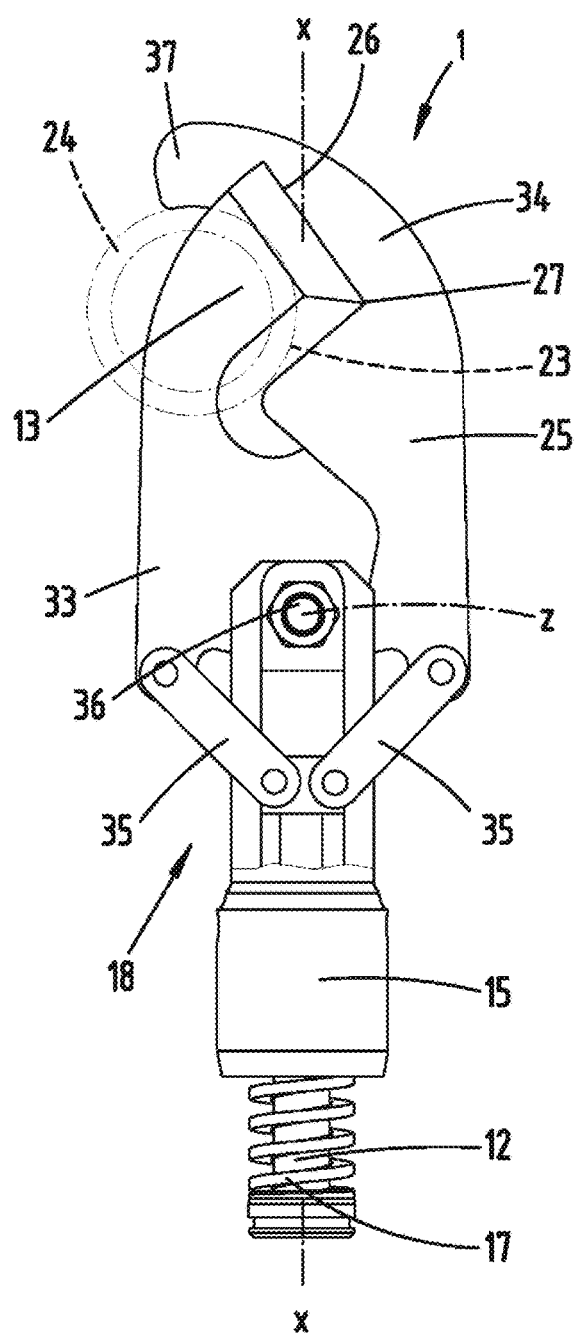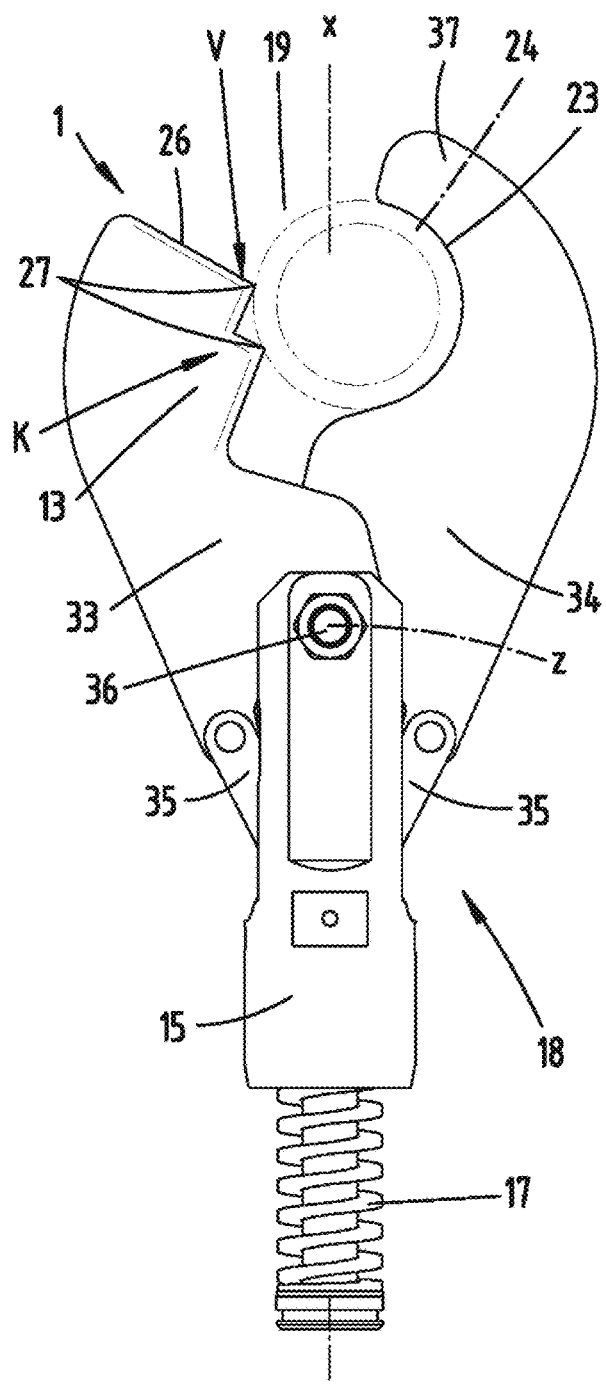

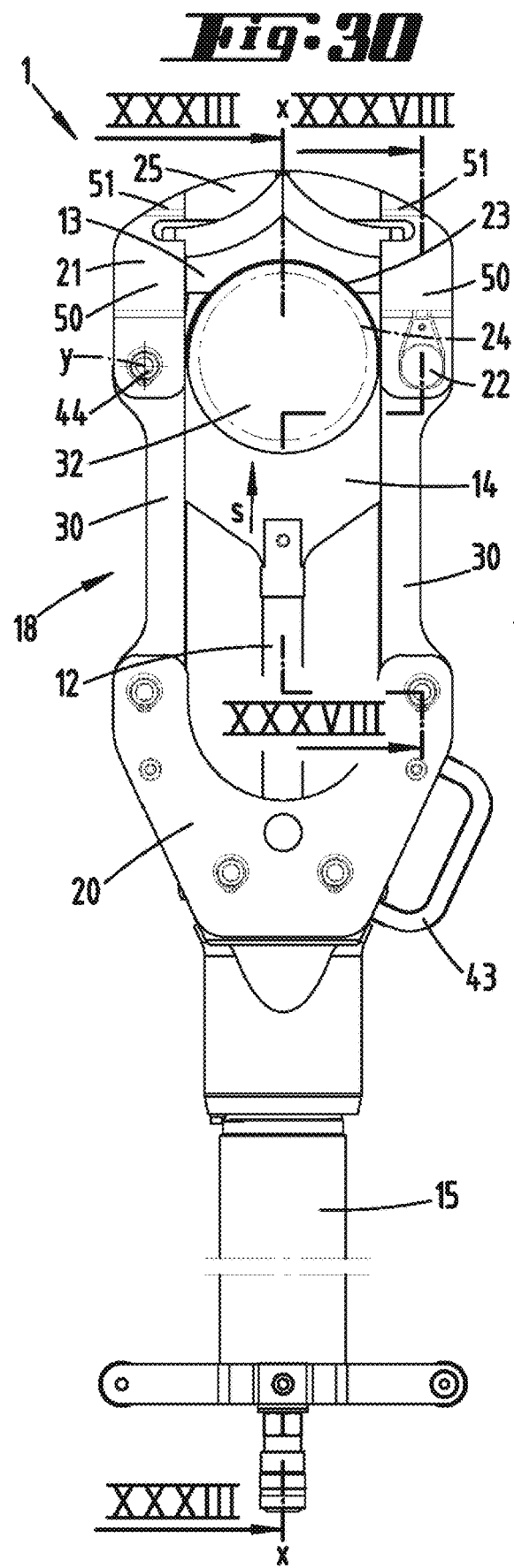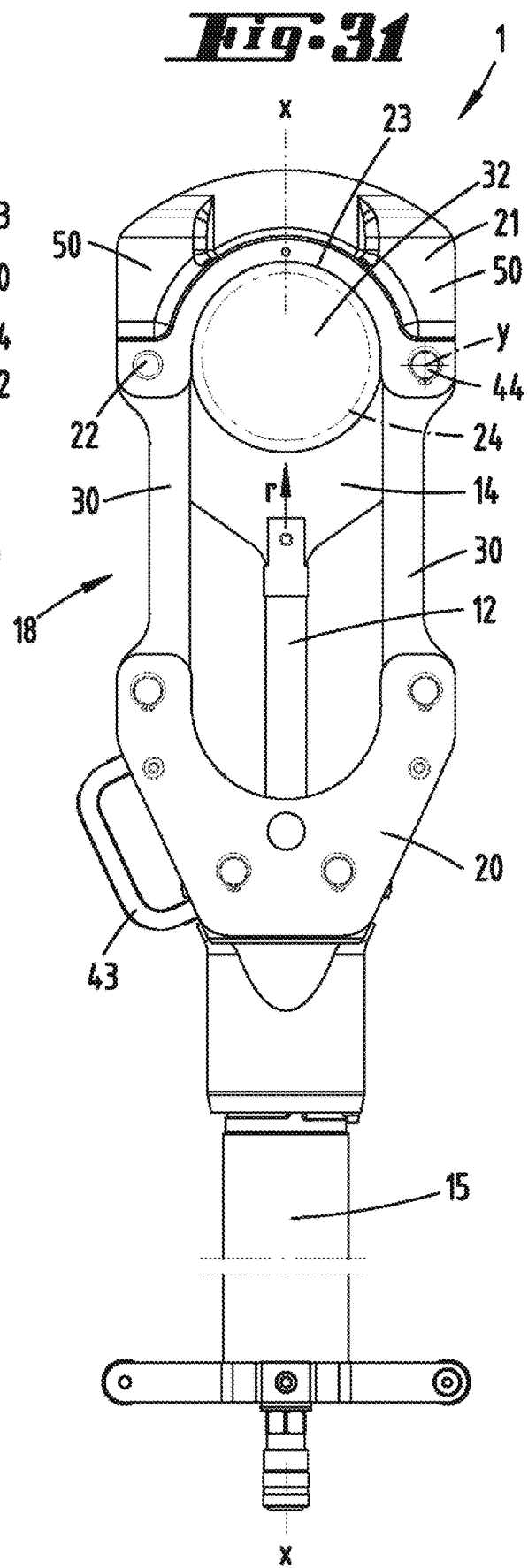

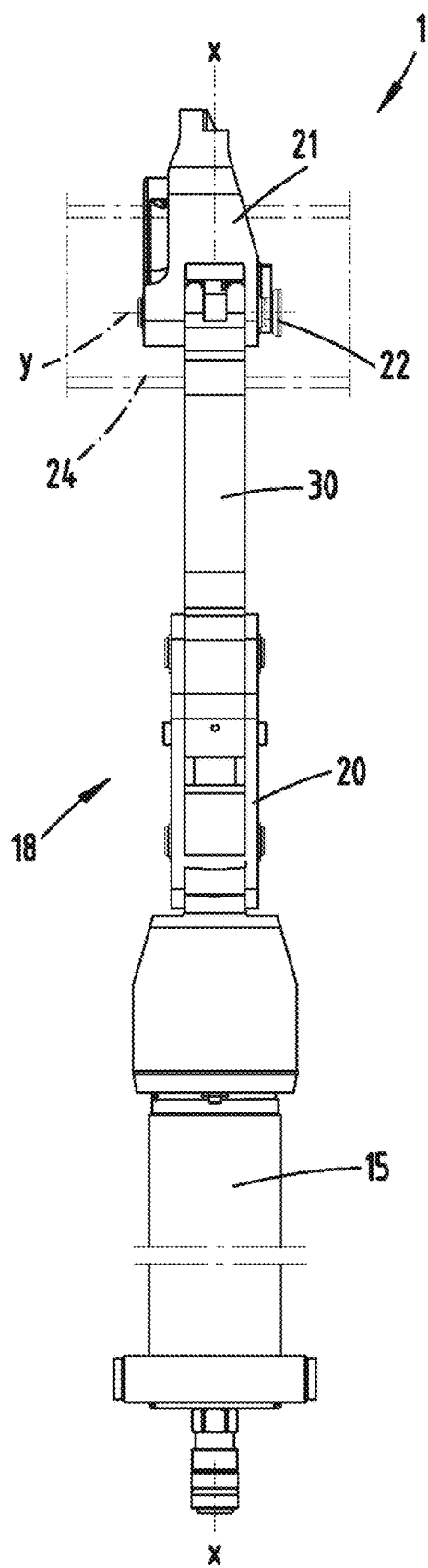
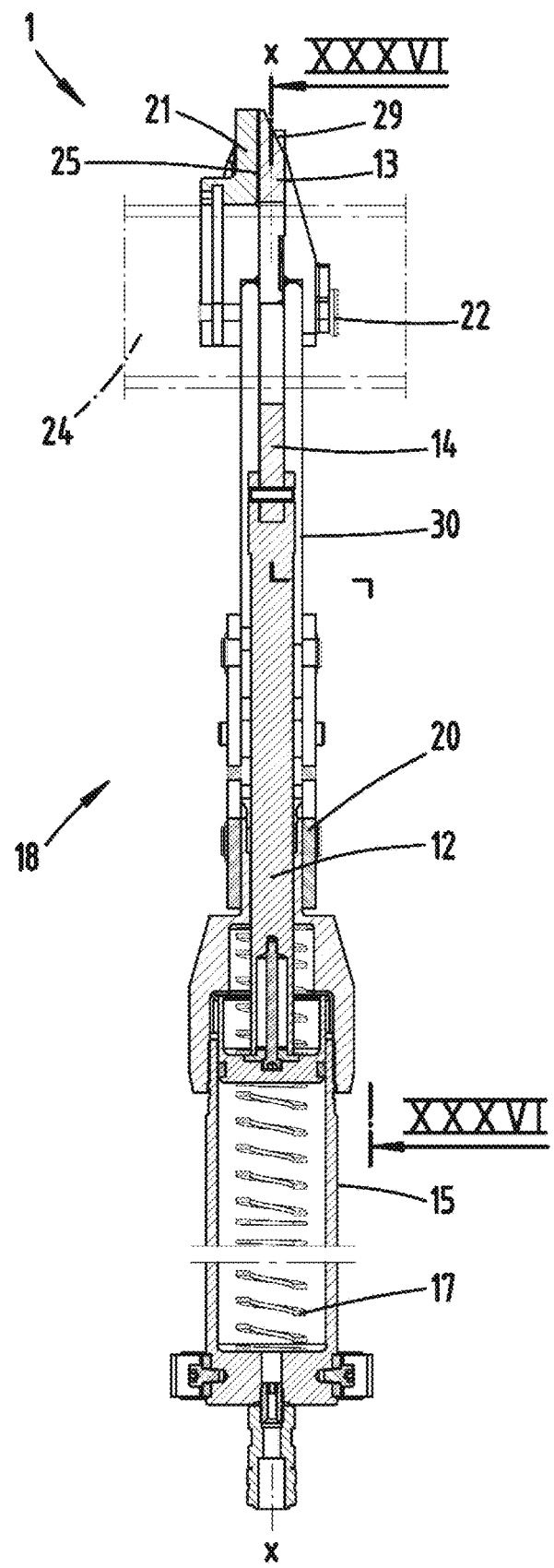

TOOL FOR CUTTING A WORKPIECE

FIELD OF TECHNOLOGY

The invention relates to a tool for cutting a workpiece, comprising a tool head, which, with respect to an outline, forms a holding frame, which is essentially rectangular with respect to the outer contour, for forming a workspace, which is closed at least in the court of the cutting process, comprising a receiving contour, in which receiving contour the workpiece can be received, wherein the tool head further has a movable cutting edge comprising a cutting contour, wherein the cutting edge passes through the receiving contour in the course of a cutting process, wherein the cutting edge can further be acted on by an advancement part.

The invention furthermore relates to a tool for cutting a workpiece, comprising a tool head having two jaws, of which jaws at least one jaw is a pivot jaw, wherein one jaw has a concave receiving contour and the other jaw has a convex contour comprising a protrusion region, which can be moved into the concave receiving contour, wherein the tool head further has a central longitudinal axis.

PRIOR ART

Tools of the type in question are known. They are used, for example, to cut pipes, further in particular pipes, which are used in structural and/or civil engineering. Electrically and/or hydraulically acting tools are thereby preferably used.

A tool is further known from U.S. Pat. No. 5,890,291 A, in the case of which, in the end state of a cutting process in the cutting direction, the cutting edge, on which an advancement part acts, also extends rearwardly of the workpiece. A tool is known from U.S. Pat. No. 5,237,899 A, in the case of which a device part containing the cutting edge cooperates with a separate receiving contour, which is to be arranged opposite to a workpiece.

SUMMARY OF THE INVENTION

In terms of the above-described prior art, an object of the invention is seen in further improving a tool of the type in question in terms of handling and in terms of the cutting process. This object is initially solved in that a position of the cutting edge is reached after the cutting edge has passed all the way through, the cutting edge is capable of being moved out from the cutting direction by being removed from the advancement part.

According to a first invention idea, a possible solution of the object is present in the case of a tool, where, from a position of the cutting edge reached after the cutting edge has passed all the way through, the focus is on the cutting edge being capable of being moved out from the cutting direction by being removed from the advancement part.

Such a design proves to in particular be advantageous when working with the tool in regions, which are difficult to access, further for example in civil engineering. After complete performance of a cutting process and corresponding separating of a workpiece by using the tool, the cutting edge does not necessarily need to be displaced back, as usual, by passing through the workpiece. On the contrary, the cutting edge, through which the workpiece has moved completely upon completion of the cutting process, can be moved into a position, which provides for a convenient removal of the tool from the workspace. The cutting edge can thereby assume a position relative to the advancement part, in which the cutting edge is distanced from the advancement part with at least a partial region, by displacing the cutting edge in a direction, which preferably does not or not entirely correspond to the cutting direction. The displacement can thereby be present in a linear direction and/or for example along a curve. The distancing can thereby refer only to cooperation regions of cutting edge and advancement part, via which cooperation regions the displacement of the cutting edge is attained via the advancement part in the course of a cutting process.

According to a further invention idea, a further solution of the object is present in the case of a tool, wherein the cutting edge further has a cutting edge tip, in the case of which the focus is on that a clearance remains between the cutting edge and the receiving contour, in response to a first contact, which is present in a projection, of the cutting edge tip with a concavely curved region of the receiving contour on one or both sides, based on an extension of the cutting knife perpendicular to the displacement direction of the cutting edge. This object is further solved in that the receiving contour limits the workspace in the traversing direction, that a clearance remains between the cutting edge and the receiving contour, in response to a first contact, which is present in a projection, of the cutting edge tip with a concavely curved region of the receiving contour on one or both sides, based on an extension of the cutting knife perpendicular to the displacement direction of the cutting edge.

As a result of this design, a favorable cutting process results, thus in particular in the case of workpieces, such as, for example, pipes, in particular pipes, which can be deformed relatively easily.

In preferred design, the tool head is embodied only for supporting the workpiece in the region of the receiving contour, thus does not form a counter cutting edge in a preferred embodiment.

To further improve a tool comprising at least one pivot jaw, it is proposed according to a further invention idea that, in response to a first contact of the central longitudinal axis by the free end of the concave receiving contour, the region of the receiving contour, which comes into contact with the receiving contour when moving into the protrusion region, is displaced back with respect to the free end by a backward displacement measure, which corresponds to one third or more, of the free opening measure of the concave receiving contour, viewed perpendicular to the central longitudinal axis.

As a result of this design, a tool is specified, which is improved in particular in terms of the work result, for example of the cutting result.

The first contact of the central longitudinal axis occurs in the free end region of the receiving contour, assigned to a free end region of the corresponding jaw. This end region thus preferably forms the one limitation of the receiving contour. Starting from the latter, the free opening measure of the receiving contour results, as a result of further limitation in a region, which is distanced from the free end region, of preferably the same jaw, wherein this distanced region is preferably at a smaller distance from the pivot axis of the at least one pivot jaw than the free end region.

The free opening measure of the receiving contour results in particular in the position, in which at least the free end region of the jaw, which has the receiving contour, but optionally also the region distanced therefrom, contacts the central longitudinal axis. In this case, the opening measure is preferably measured along the central longitudinal axis or along a parallel thereto.

The described backward displacement measure preferably results in a position, in which the jaw, which has the receiving contour, contacts the central longitudinal axis with its free end, which preferably faces the other jaw. Viewed perpendicular to this axis, the backward displacement measure results as distance of the central longitudinal axis (or of the line defining the free opening measure, respectively) to the region or point of the receiving contour, which is contacted first by the protrusion region of the other jaw in the course of the pivoting. This does not need to be position, in which the free end of the one jaw contacts the central longitudinal axis. On the contrary, this can also be a pivot position, which goes beyond this.

The backward displacement measure can correspond to one third or more, for example up to half or two thirds or more of the opening measure. The backward displacement measure can also correspond to one tenth or more, for example up to half or two thirds or more of the displacement path of the protrusion region along a circular line.

The features of the above-described are significant, both alone and in every combination with one another. For example, a cutting edge of the tool head can thus be formed in such a way that, in response to a first contact with the concavely curved region of the receiving contour, it leaves a clearance on one or both sides. The above-described backward displacement measure, for example, can further also be used in the case of a cutting edge, which, with removal from the advancement part, can be moved out from the cutting direction and/or in the case of a cutting edge, the cutting edge tip of which leaves a clearance on one or on both sides in response to contact.

The advancement part, which acts on the cutting edge in the cutting direction can, as is preferred, be arranged and can optionally be guided in the tool head. In a further development, the advancement part can be held and/or guided in the tool head in a captive manner.

From the position, which corresponds to the complete pass-through, the cutting edge can be capable of being removed from the tool head. After resetting the tool head for performing a further cutting process, the cutting edge can be inserted into the tool head again. A significant ease and ease of handling of the tool is also provided with this.

In an alternative or also combinative design, the cutting edge can be pivotable relative to the advancement part about an axis, which runs perpendicular to the cutting direction. The cutting edge can thus be pivoted relative to the advancement part, from a position, which corresponds to the complete pass-through, so that said cutting edge can be pivotably displaced into a position, which is at least partially distanced from the workpiece and the advancement part, while holding the cutting edge on the tool via the joint construction, advantageously optionally in a captive manner. The joint can also be formed in such a way that the cutting edge can be removed from the tool head after pivoting has occurred.

According to a possible design, the pivotability of the cutting edge essentially relative to the tool can be at hand as a result of a pivot connection to the advancement part. A direct connection of the cutting edge to the advancement part is thereby thus at hand via the pivot connection. The pivot connection can, and as is preferred, be formed so as to not be operatively releasable, but, in the alternative, can optionally be capable of being released by using a tool, for example for the purpose of a replacement of the cutting edge. The pivot connection can be at hand, for example via a rotary joint.

Alternative to or also in combination with a pivot connection to the advancement part, the cutting edge can also be capable of being pivoted relative to the advancement part by means of a holding part. The holding part is thereby part of the tool, in particular part of the part of the tool head, which is stationary during the advancement of the cutting edge and which also has the receiving contour. This holding part of the tool head, together with the cutting edge, can thus be designed so as to be capable of being pivoted relative to a stationary section of the tool head. In the course of the displacement of the cutting edge in the cutting direction, in particular upon conclusion of the completely performed cutting process, the cutting edge can thereby be placed down quasi into or on the holding part via the advancement part, whereupon a pivoting of the cutting edge, together with the holding part, can optionally take place. An opening of the receiving contour then also takes place with this pivoting.

For this purpose, the cutting edge can cooperate with the advancement part solely in the cutting direction, for example via corresponding contact surfaces.

According to a possible design, a backward displacement of the cutting edge in response to corresponding backward displacement of the advancement part cannot be provided. The cutting edge can optionally remain in the holding part or on the holding part, respectively, in this case, further optionally for completely removing the cutting edge and/or for pivoting the cutting edge into a position, which releases the receiving contour.

In alternative design, the cutting edge can, however, also be connected to the advancement part to provide for a slide displacement of the cutting edge opposite the cutting direction. For example a releasable locking connection can be provided here, which provides for a release of the cutting edge from the advancement part when a predetermined release force is exceeded. In the case of conventional cutting processes, an entrainment of the cutting edge by means of dragging can thus be performed opposite to the cutting direction. In the case of possible cutting processes, in which the cutting edge cants, for example on the severed workpiece, for example in the course of a back-dragging movement opposite the cutting direction, the locking connection to the cutting edge is released as a result of the advancement part, which moves back continuously, so that the advancement part alone can be displaced back. After this, the cutting edge itself is exposed for the complete removal and/or for the pivoting.

For this purpose, the locking connection can have a locking arm. This locking arm can be provided on the advancement part, while a locking seat, which cooperates with the locking arm, can be provided on the cutting edge. In the alternative, the locking seat is provided on the advancement part side and the locking arm on the cutting edge side.

In a possible embodiment, the locking arm can allow for a distancing of the advancement part from the cutting edge without releasing the locking connection. In the case of such a design, the locking arm and the locking seat cooperating therewith is designed in such a way that a preferred linear relative displacement is made possible between advancement part and cutting edge in the cutting direction or opposite the cutting direction, respectively. An entrainment by means of dragging can take place via the locking connection upon completion of this relative displacement.

The possible locking connection can, and as is preferred, also be used in connection with a pivotability of the cutting edge relative to the advancement part, in particular in the case of a solution, in which the cutting edge is pivotably connected to the holding part of the tool head.

The cutting edge can be acted on by the advancement part as a result of force transmission via a stop surface, which is formed separately from the locking arm. A stop surface of this type can be provided on the advancement part side as well as on the cutting edge side, wherein the stop surfaces of cutting edge and advancement part have a force-transmitting effect when abutting on one another. According to a preferred design, these stop surfaces can have a force-transmitting effect only in the cutting direction. In the direction, which is directed opposite to the cutting direction, an entrainment by means of dragging can be at hand via the locking connection.

According to a further embodiment, two locking arms can be provided for this purpose, wherein two stop surfaces can in each case further also be provided on the advancement part side as well as on the cutting edge side. A locking arm can be assigned to each stop surface of the advancement part or of the cutting edge.

In the case of a possible arrangement of two locking arms, they can be designed to be located transversely opposite to the cutting direction with respect to an opening of the receiving contour. The locking arms can thus be assigned to the stop surfaces, for example of the advancement part, which limit the receiving contour on both sides, viewed in the cutting direction.

In particular in the case of a releasable locking connection between cutting edge and advancement part, the holding part of the tool head can be formed in such a way that it receives the cutting edge in a pocket-like manner in the advancement position, which optionally corresponds to a final position viewed in the cutting direction. The cutting edge can thus be received in the holding part in the form of an insertion part and can thus be removed or pivoted as a whole from the otherwise stationary tool head, optionally together with the holding part. The corresponding insertion holder of the cutting edge in the holding part can provide for the removal of the cutting edge, for example in a position, in which the holding part is pivoted away, for example for the purpose of a cutting edge replacement.

Assigned to a central region, which is present based on a direction transversely to the cutting direction, the cutting edge can have guide means, which cooperate with counter guide means of the holding part. This cooperation leads to a central alignment of the cutting edge in the course of the displacement thereof in particular in the cutting direction, which in particular turns out to be advantageous, when a certain deflection from the central alignment takes place in the course of the cutting.

The cutting edge can also have positioning means transversely to the cutting direction and, based on a width of the cutting edge, also transversely to the width direction of the cutting edge, which positioning means can cooperate with counter positioning means of the holding part. A cutting edge, which is offset or pushed out in particular in the thickness direction of the cutting edge, in particular in the course of the cutting process, can thus be pushed back into the predetermined alignment plane, which can correspond to the cutting plane, in a suitable manner.

As also further preferred, the holding part or the tool head, respectively, can have a receiving contour, which is adapted to the cross section of the workpiece, for example pipe, to be cut. The receiving contour can thereby further also be cross-sectionally adapted to a cross section, which is largest for this tool head or for the provided cutting edge, respectively, of a workpiece to be cut. According to a further preferred design, a positioning part can be fastened to the holding part or to the tool head assigned to the receiving contour, for aligning workpieces with smaller diameters so as to also be able to thereby properly cut workpieces with a smaller cross section, for example pipes with a smaller diameter, by means of this tool head and this receiving contour, in particular in consideration of a desired centering and supporting of the workpiece to be cut. The positioning part can be present as separate part for this purpose and can be assigned to the tool head or to the holding part, respectively, if needed. The positioning part can furthermore have, for example, two positioning arms, which run in a wedge-shaped manner to one another and via which a centering of the workpiece, for example pipe, to be cut can be attained.

The advancement part can also be designed in a fork-shaped manner, comprising two fork ends, which act on the cutting edge outside of a cutting region of the cutting edge. The fork opening can be adapted to the outer contour of the workpiece to be cut, to the circular cross section of the pipe in the case of a tool. The cutting edge is displaced via the fork ends of the advancement part by means of the workpiece in order to cut the latter. The impact surfaces in the region of the fork ends and of the cutting edge can extend outside of the cutting region and thus in an overlap position outside of the workpiece outline, as is preferred, which facilitates the removal of the cutting edge after performing the cutting process. After performing the cutting process, the cutting edge can be exposed completely with respect to the workpiece.

The fork contour can furthermore also be found in the cutting edge in a mirrored manner, so that in the use position when the cutting edge abuts on the fork ends, an opening comprising an opening contour adapted to the workpiece cross sectional contour results with reference to a top view onto the cutting edge and the advancement part. In a possible design, the opening in each case results half as a result of the fork-shaped design of the advancement part and the fork-shaped design of the cutting edge.

The receiving contour can also be formed on a holding part, which, based on a cross section, is embodied in a side-by-side arrangement to the cutting edge. The cutting edge is thus preferably designed and arranged for passing over the receiving contour.

As is preferred, the holding part can form a traversing surface facing the cutting edge, on which, laterally bearing thereon, the cutting edge moves relative to the holding part. A planar traversing surface is at hand in this respect. After completely performing the cutting process, the cutting edge can optionally abut completely on this traversing surface.

The cutting edge can be moved relative to the holding part until the clearance or the clearances are closed completely. Further preferably, a movement of the cutting edge in the course of a cutting process beyond this position, in which the clearances are closed completely, is present. A displacement of the cutting edge alone, for example in the case of a two-part design of cutting edge and advancement part, can also be made possible beyond the tool head, thus for example to remove the cutting edge, which removal essentially takes place in the cutting direction or at least in a direction, which is overlapped by the cutting direction.

In a possible design, the cutting edge can have one or a plurality of cutting edge tips. Two or three or more cutting edge tips can thus also be provided. In the case of a design of only one cutting edge tip, the latter can be provided in the center with reference to a top view onto the displacement plane, furthermore optionally in arrow-like design. This one cutting edge tip of the cutting edge thus preferably hits the pipe in the center, based on the diameter thereof, in the course of the cutting process and in response to a cutting of a tubular workpiece.

In the case of a central formation of the cutting edge tip, as described above, this region can also be the region, which first passes through the workpiece completely, in particular in the case of tubular design of the workpiece, in the cutting direction. In this position, which corresponds to the position, in which a first contact of the cutting edge region with the receiving contour occurs in a projection, the above-described clearances preferably result between the cutting edge and the receiving contour on both sides of the cutting edge tip in a top view.

The one or plurality of cutting edge tips can, and as is preferred, be designed symmetrically to a traversing line of the cutting edge, which goes through the center of the receiving contour. The traversing line further preferably also passes through the workpiece in the center. The traversing line can run in a straight line, but also along a circular arc.

In a longitudinal cross section through the cutting edge tip, the cutting edge can also have a wedge-shaped section on one side from a planar lower surface. A ground section or a chamfer, respectively, results from the cutting edge and from the planar lower surface facing the traversing surface of the holding part. A precise cut is thereby possible. This wedge-shaped section as positioning means of the cutting edge also serves to cooperate with a counter positioning means of the holding part and/or of the tool head.

A guide part can additionally be arranged on one or both sides of the traversing surface of the holding part in the width direction on the other side of an outer edge of the cutting edge, for the U-shaped enclosure of an edge region of the cutting edge. The cutting edge thereby experiences a guidance in the cutting direction along the traversing line of the cutting edge, preferably at least to a cutting edge position, in which the cutting edge is displaced completely beyond the receiving contour in the cutting direction.

A further favorable handling can be attained in that the holding part, together with the cutting edge, forms a closed workspace when performing a cutting process.

A favorable handling also results in the case of a design, in which the holding part can be folded open to receive a workpiece. For example in the case of a pipe, which is installed or which is to be severed, respectively, the holding part can thus be placed around this pipe as a result of pivot displacement of the holding part, whereupon a closed workspace forms. The holding part closed position can be secured, as is preferred, for example secured by means of locking.

It can be provided in a possible design that the tool head has two pivot jaws. To perform a cutting process, they can, and as is preferred, be pivoted towards one another simultaneously, further preferably evenly, wherein the cutting edge of the first pivot jaw passes over the receiving contour of the second pivot jaw, preferably completely, in the course of such a pivot movement.

The displacement of the two pivot jaws back into an initial position can, and as is preferred, be attained by means of a backward pivoting.

A pivot jaw can thus further be moved on a circular arc. The center of the circular arc can be located on the central longitudinal axis of the tool head. The pivot axis of the corresponding pivot jaw preferably extends perpendicular to the central longitudinal axis.

In the case of the arrangement of two pivot jaws, both pivot jaws can be moved on a circular arc.

In the case of formation of the tool with at least one pivot jaw, the convex contour of the one pivot jaw can be formed as cutting edge. The protrusion region of the convex contour can be formed as cutting edge tip.

BRIEF DESCRIPTION OF THE DRAWINGS

The invention is described below by means of the enclosed drawing, which, however, only represents exemplary embodiments. A part, which is only described on the basis of one of the exemplary embodiments and which is not by a different part in the case of a further exemplary embodiment on the basis of the special feature highlighted there, is thus also described as an at least possible available part for this further exemplary embodiment. In the drawing, FIG. 1 shows a tool in perspective illustration, relating to a first embodiment;

FIG. 2 shows the tool in a first view;

FIG. 3 shows the tool in a further view;

FIG. 4 shows the tool in a side view;

FIG. 5 shows an illustration corresponding to FIG. 3, but relating to a position with opened workspace;

FIG. 6 shows the section according to line VI-VI in FIG. 2;

FIG. 7 shows the section according to line VII-VII in FIG. 3;

FIG. 8 shows the section according to line VIII-VIII in FIG. 5;

FIG. 9 shows the section according to line IX-IX in FIG. 2;

FIG. 10 shows a follow-up illustration for FIG. 2 in the course of a cutting process;

FIG. 11 shows the enlargement of the region XI in FIG. 10;

FIG. 12 shows a follow-up illustration for FIG. 10, after completion of the cutting process;

FIG. 13 shows the section according to line XIII-XIII in FIG. 6;

FIG. 14 shows an illustration corresponding to FIG. 1, relating to a second embodiment;

FIG. 16 shows an illustration corresponding to FIG. 15, relating to the removal of the cutting edge from the tool head after performing a cutting process;

FIG. 21 shows a perspective illustration of a tool in a further embodiment;

FIG. 22 shows an illustration according to FIG. 2, relating to the embodiment according to FIG. 21;

FIG. 23 shows the section according to line XXIII-XXIII in FIG. 22;

FIG. 24 shows a follow-up illustration for FIG. 22 in the course of a cutting process;

FIG. 25 shows a further follow-up illustration in the course of a cutting process;

FIG. 26 shows the enlargement of the region XXVI in FIG. 25;

FIG. 27 shows a follow-up illustration for FIG. 25, after completion of the cutting process;

FIG. 28 shows a tool in an illustration according to FIG. 22, relating to a further embodiment;

FIG. 30 shows the tool of the embodiment according to FIG. 29 in a first view;

FIG. 32 shows the tool in a side view;

FIG. 33 shows the section according to line XXXIII-XXXIII in FIG. 30;

FIG. 37 shows a sectional illustration corresponding to FIG. 36, relating to a cutting edge entrainment position via an advancement part, which moves back opposite to the cutting direction;

DESCRIPTION OF THE EMBODIMENTS

What is illustrated and described, initially with reference to FIG. 1, is a first embodiment of a tool 1, in particular of a hydraulic tool, in the form of a replaceable unit head, which is assigned to a base unit 2.

Figure 17:
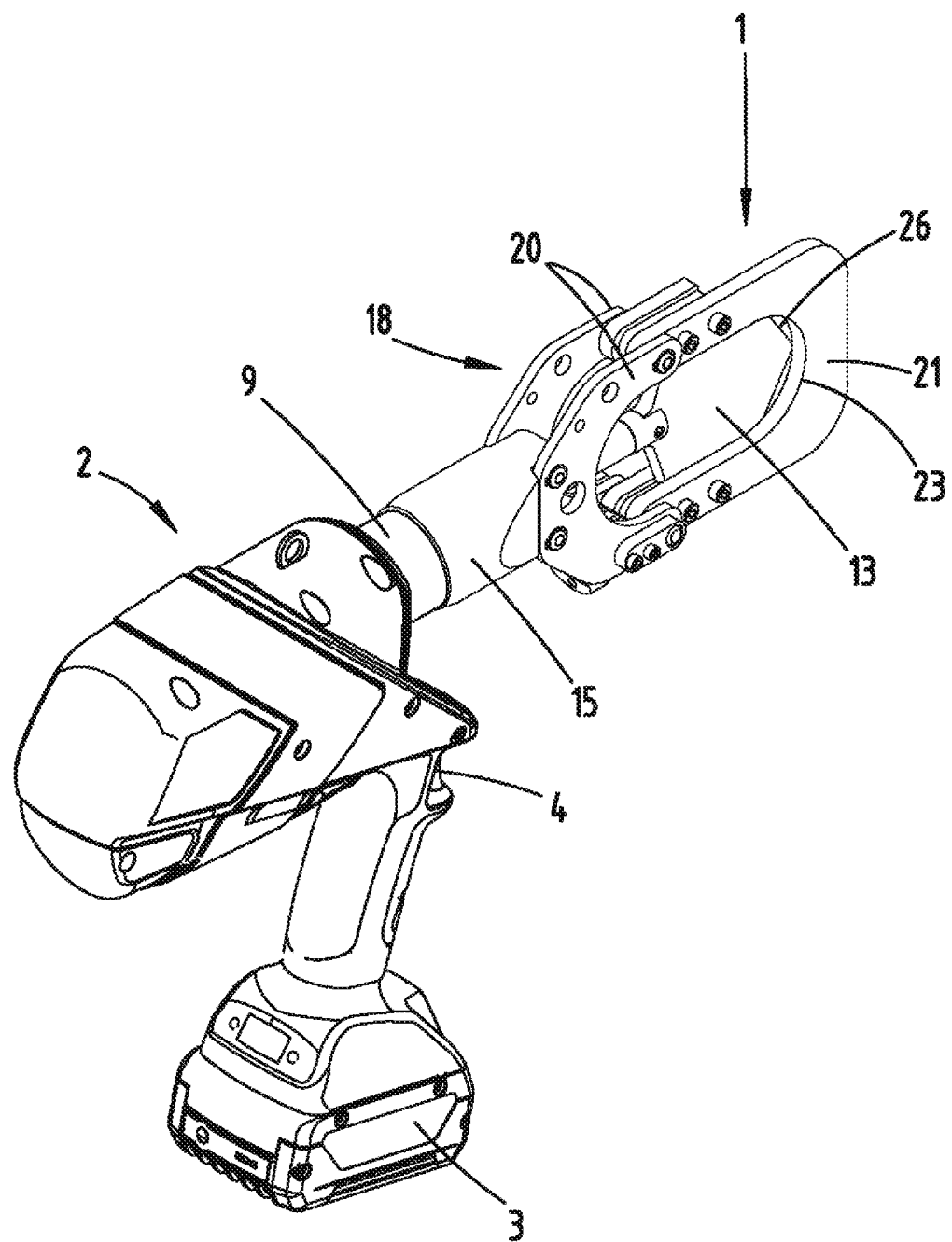
FIG. 17 shows the arrangement of the tool on a base unit in perspective illustration.

According to the illustration in FIG. 17, the base unit 2 can be designed in a pistol-like manner, comprising a grip region 3, in which an accumulator for the electrical operation of a hydraulic pump is arranged in the unit. The base unit 2 can be put into operation via an electric button 4. A unit of this type is known, for example, from WO 2008/138987 A2 (U.S. Pat. No. 8,056,473 B2).

Figure 18:
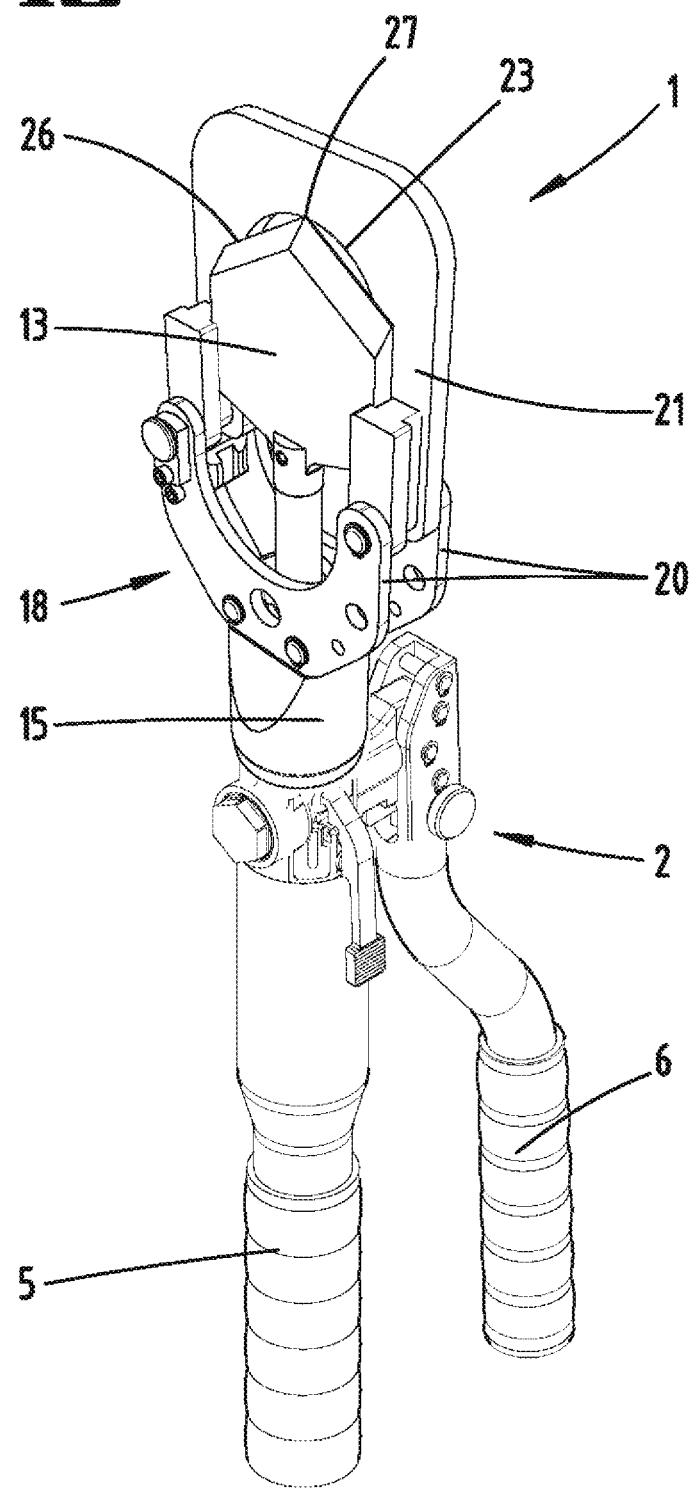
FIG. 18 shows an illustration corresponding to FIG. 17, relating to the arrangement on an alternative base unit.

The base unit 2 can also be formed to receive the tool 1 as hand tool according to the illustration in FIG. 18. The hand tool can be actuated by pivoting the handles 5 and 6, wherein a hydraulic pressure is generated via a non-illustrated pump arrangement.

Figure 19:
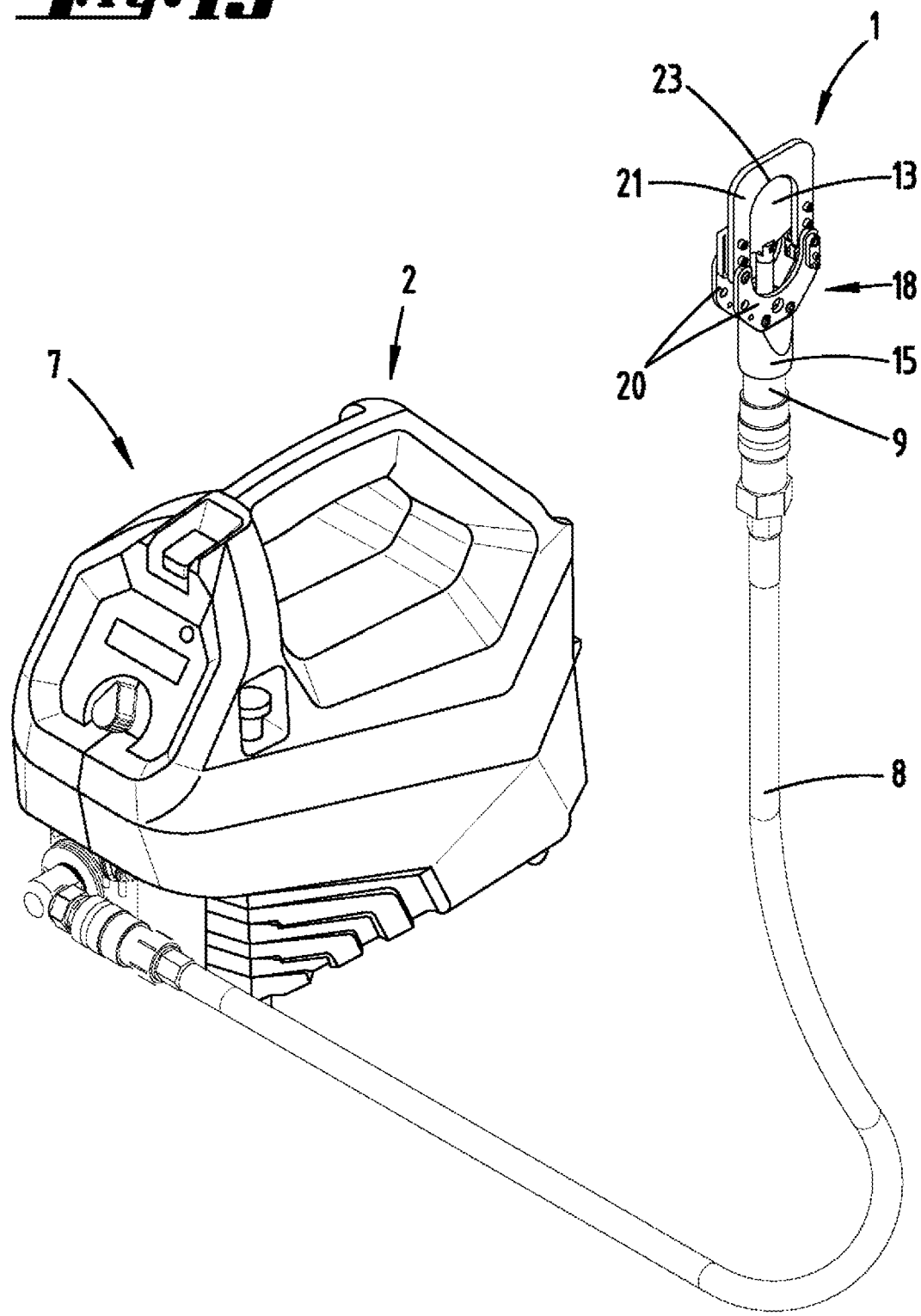
FIG. 19 shows a further alternative arrangement according to FIG. 17.

The base unit 2 can also be formed according to the illustration in FIG. 19, having a drive unit 7, by means of which hydraulic pressure can be generated, and hydraulic medium is guided through a connected hydraulic hose 8 to the other end of the hydraulic hose and the tool 1 connected here.

In the base unit 2, oil is pumped from a storage room into the cylinder 9 in response to corresponding actuation, whereby a piston 10 is moved in the direction of its final operating position.

The tool 1 is arranged on the cylinder 9, which comprises the piston 10, which is provided with a radial seal 11.

The hydraulic cylinder 9, which is formed essentially in a pot-shaped manner, is formed to be open, facing the tool 1, and serves to guide the piston 10 on the inner wall on the one hand and for connecting the tool 1 on the outer side on the other hand.

The cylinder 9 comprises a piston shaft 12, which is the support for a cutting edge 13 on the tool side or which, in the case of a two-part design, as will be specified in more detail below, is the support for an advancement part 14 for the cutting edge 13. The tool is connected to the base unit 2 by means of a cylinder section 15. Radially on the inside, the cylinder section 15 forms a stop wall 16, which is permeated by the piston shaft 12. The stop wall 16 serves to support the one end of a cylinder compression spring 17 comprising the piston shaft 12, the other end of which acts on the piston 10. The piston 10 includes the piston shaft 12 and the advancement part 14.

In the embodiments illustrated in FIGS. 1 to 20, a tool head 18 is fastened to the cylinder section 15 of the tool 1. With reference to an outline according to FIG. 2, said tool head forms a holding frame, which is essentially rectangular with respect to the outer contour, for forming a workspace 19, which is closed at least in the course of the cutting process.

The tool head 18 thereby initially consists essentially of two base holding parts 20, which are secured directly to the cylinder section 15 and which are each preferably designed in a plate-shaped manner, on both sides of a tool center line, which lengthens the central longitudinal axis x in the traversing direction r of the cutting edge 13, and which are arranged evenly spaced apart from this center line. The broadside surfaces of the base holding parts 20 face one another. The clear distance between the base holding parts 20, viewed transversely to the axial direction, is preferably selected to be larger than the thickness of the cutting edge 13 and/or of the advancement part 14, viewed in the same direction.

The base holding parts 20 are further designed in an essentially fork-shaped manner with reference to the outline, comprising a fork opening facing in the traversing direction r. The fork opening limits the above-described workspace 19 opposite to the traversing direction r.

A holding part 21, which, in the outline, is designed in an essentially U-shaped or fork-shaped manner, respectively, can further be part of the tool head 18. Said holding part is preferably also designed in a plate-shaped manner. In the case of a design of the tool head 18 as essentially rectangular holding frame, the holding part 21 can be pivotably fastened to the base holding parts 20 as essentially rectangular holding frame in the area of a fork end. The corresponding pivot axis y runs perpendicular to the central longitudinal axis x.

In a tool head closed position, the holding part 21 can thereby preferably be secured with its other fork end via a displaceable bolt 22 by means of locking.

To limit the workspace 19 in the traversing direction r, the holding part 21 has a receiving contour 23. Said receiving contour is preferably adapted to the outer contour of a workpiece 24 to be cut, according to the illustration thus in the shape of semicircle, adapted to the outer contour of a pipe to be cut.

The cutting edge 13 as well as preferably the advancement part 14, which is optionally provided, is designed in a plate-shaped manner, wherein in particular the cutting edge 13 further bears laterally with a broadside surface on a facing traversing surface 25 of the holding part 21. In particular in a cutting position, which is brought forward, the broadside surface of the cutting edge 13 facing away from the holding part 21 is not overlapped by a further region in particular of the tool head 18, can thus essentially be exposed in particular in a position according to the illustration in FIG. 12, which is brought forward.

With reference to an outline according to FIG. 2, the cutting edge 13 has a cutting knife edge 26, which runs in an arrow-like manner, comprising a protrusion region V in the form of a cutting edge tip 27, which, in a perpendicular projection of the cutting edge 13 on the facing traversing surface 25 of the holding part 21, is located on the central longitudinal axis x and thus runs along a traversing line, which divides the workspace 19 in the traversing direction r, in the course of the cutting process.

In a longitudinal cross section through the cutting edge 13 and in particular in the case at hand through the cutting edge tip 27, the cutting edge 13 has a, for example, planar lower surface 28, via which it glides on the traversing surface 25 of the holding part 21. A wedge-shaped section 29 starts at this lower surface 28. Forming an acute angle of approximately 30° to 45° to the lower surface 28, said wedge-shaped section extends opposite to the traversing direction r. Instead of a preferably continuously planar design, the lower surface 28 can also have one or a plurality of offsets, with which the cutting edge 13 glides on the traversing surface 25.

The wedge-shaped section 29 results over the entire knife edge 26, thus on both sides of the cutting edge tip 27.

In particular the cutting edge 13 experiences a guidance in the traversing direction r as a result of an arrangement of two guide parts 30, which are fastened to the holding part 21 on the traversing surface 25. A guide part 30 of this type is in each case assigned to a fork section of the holding part 21, for the respective cooperation with an outer edge 31 of the cutting edge 13, which runs in the traversing direction r. The guide parts 30 and the holding part 21 define first and second channels 66 which open into the workspace 19, see FIG. 14.

In a cross section according to the illustration in FIG. 9, the arrangement and design of the guide parts 30 results in an enclosure, which is U-shaped as a whole, of the respective facing outer edge 31 of the cutting edge 13.

To perform a cutting process, the tool head 18 with the workspace 19 thereof can be opened by pivoting away or even completely removing the holding part 21. By catching the workpiece 24, which is to be cut, in the workspace 19, the tool head 18 is subsequently closed by correspondingly pivoting back the holding part 21.

The workpiece 24 abuts on the receiving contour 23 of the holding part 21 in a supporting manner.

As a result of hydraulic effect, the cutting edge 13 is displaced via the piston shaft 12 in the traversing direction r and thus in the direction of the workpiece 24, wherein, in the case of the design of the workpiece 24, which preferably has a circular cylindrical cross section, the cutting edge tip 27 first hits the jacket surface of the workpiece 24 (see FIG. 3). A cutting direction s corresponding to the traversing direction r results. The outer side edges 31 of the cutting edge 13 move along the channels 66 in the guide parts 30.

In the course of the further displacement of the cutting edge 13 in the traversing direction r, a preferably even severing of the workpiece 24 occurs, from the traversing line, which is also represented by the central longitudinal axis x, evenly to the outside on both sides—with reference to an outline illustration according to FIG. 10. The outer side edges 31 of the cutting edge 13 continues to move along the channels 66, see FIG. 14.

In a position according to FIG. 10, in which the cutting edge tip 27 contacts the receiving contour 23 of the holding part 21 in a perpendicular projection of the cutting edge 13 onto the holding part 21, clearances F between the knife edge 26 and the receiving contour 23 result transversely to the traversing direction r on both sides of the cutting edge tip 27. By pushing the cutting edge tip 27 through the workpiece 24, regions, which are not yet severed by further supporting the workpiece 24 on the receiving contour 23, result on both sides of the cutting edge tip 27. This occurs only with further displacement of the cutting edge 13 in the traversing direction r and thus complete displacement of the knife edge 26 beyond the receiving contour 23 (see FIG. 12).

Figure 14:
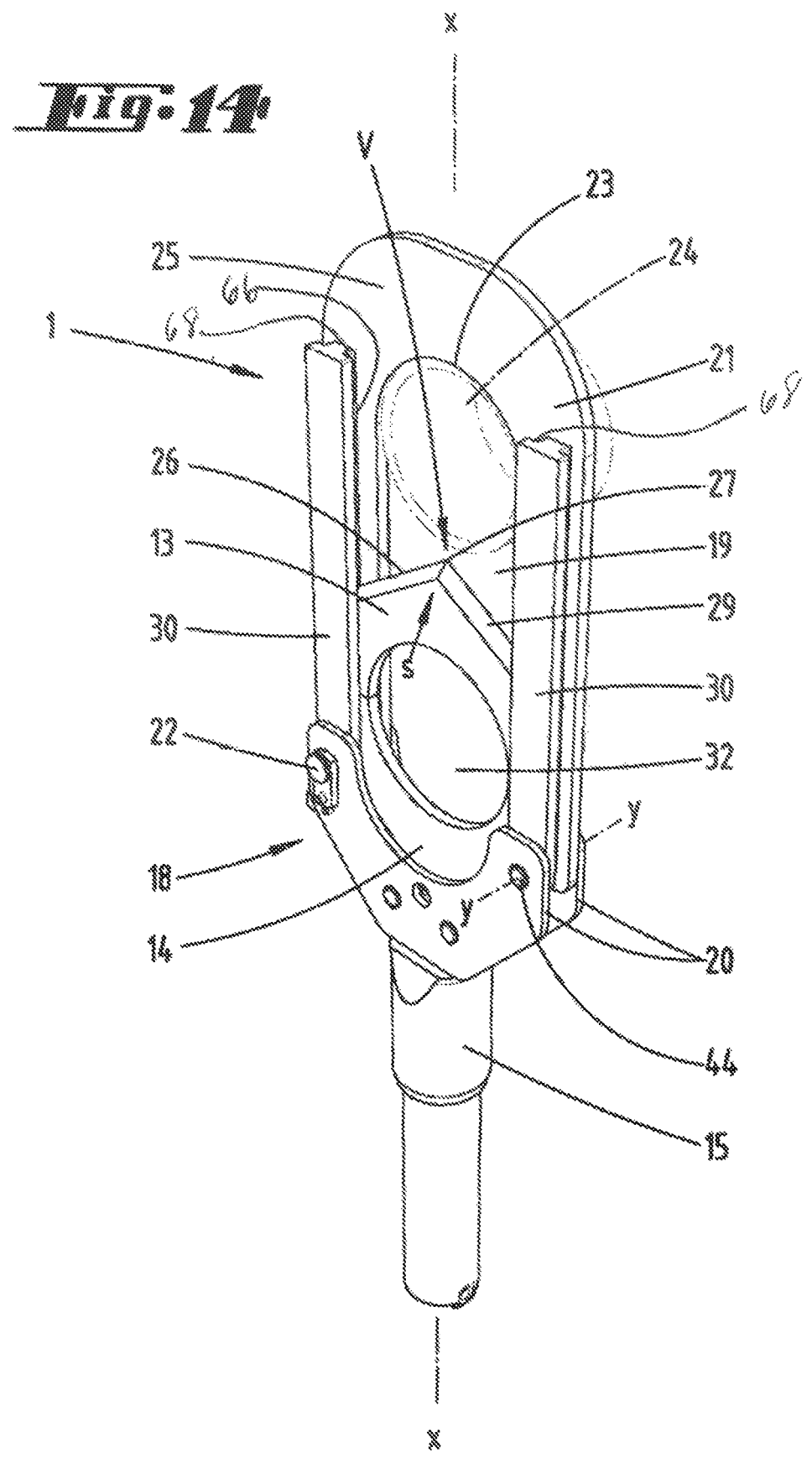
Figure 15:
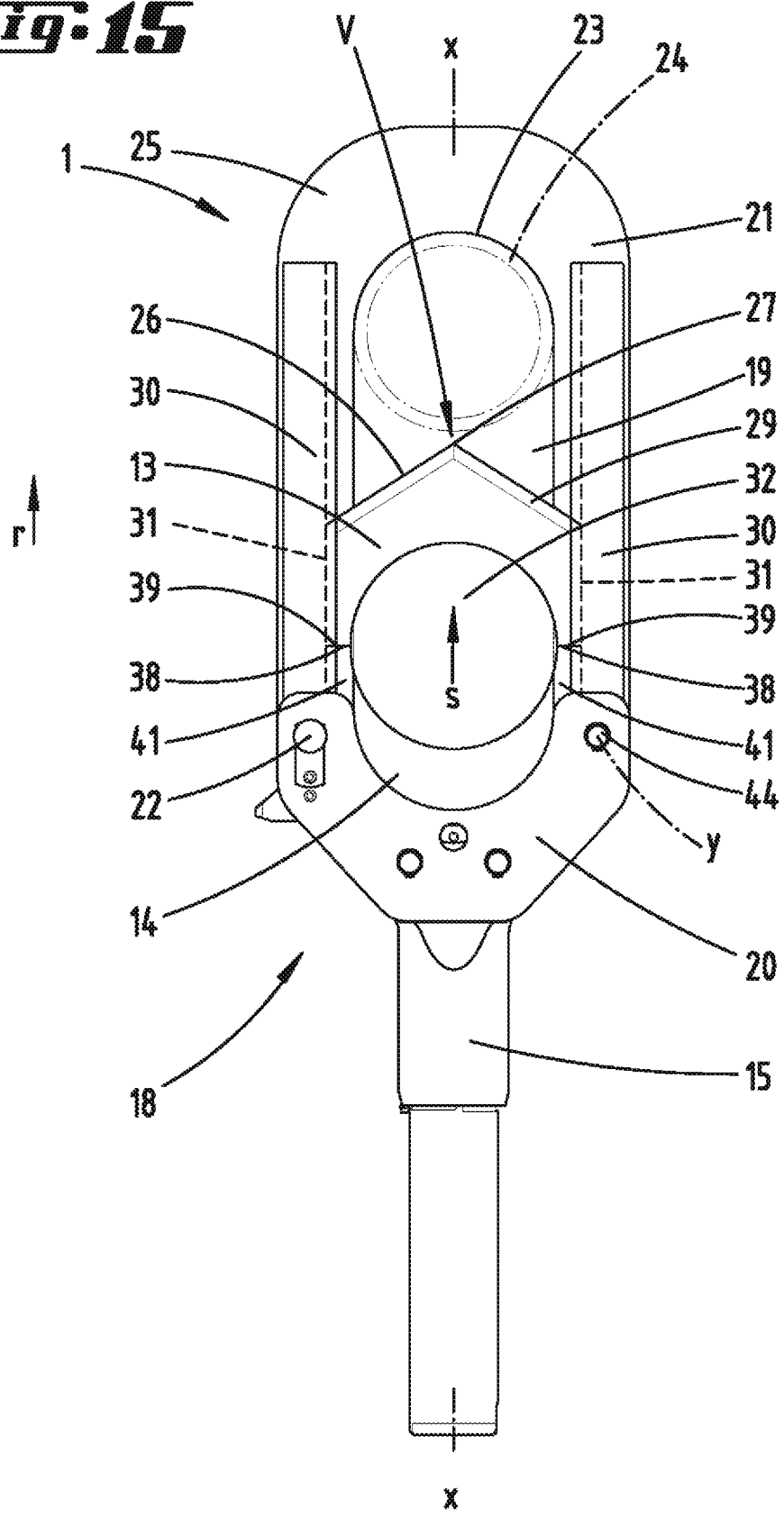
FIG. 15 shows an illustration corresponding to FIG. 2, relating the embodiment according to FIG. 14.
Figure 16:
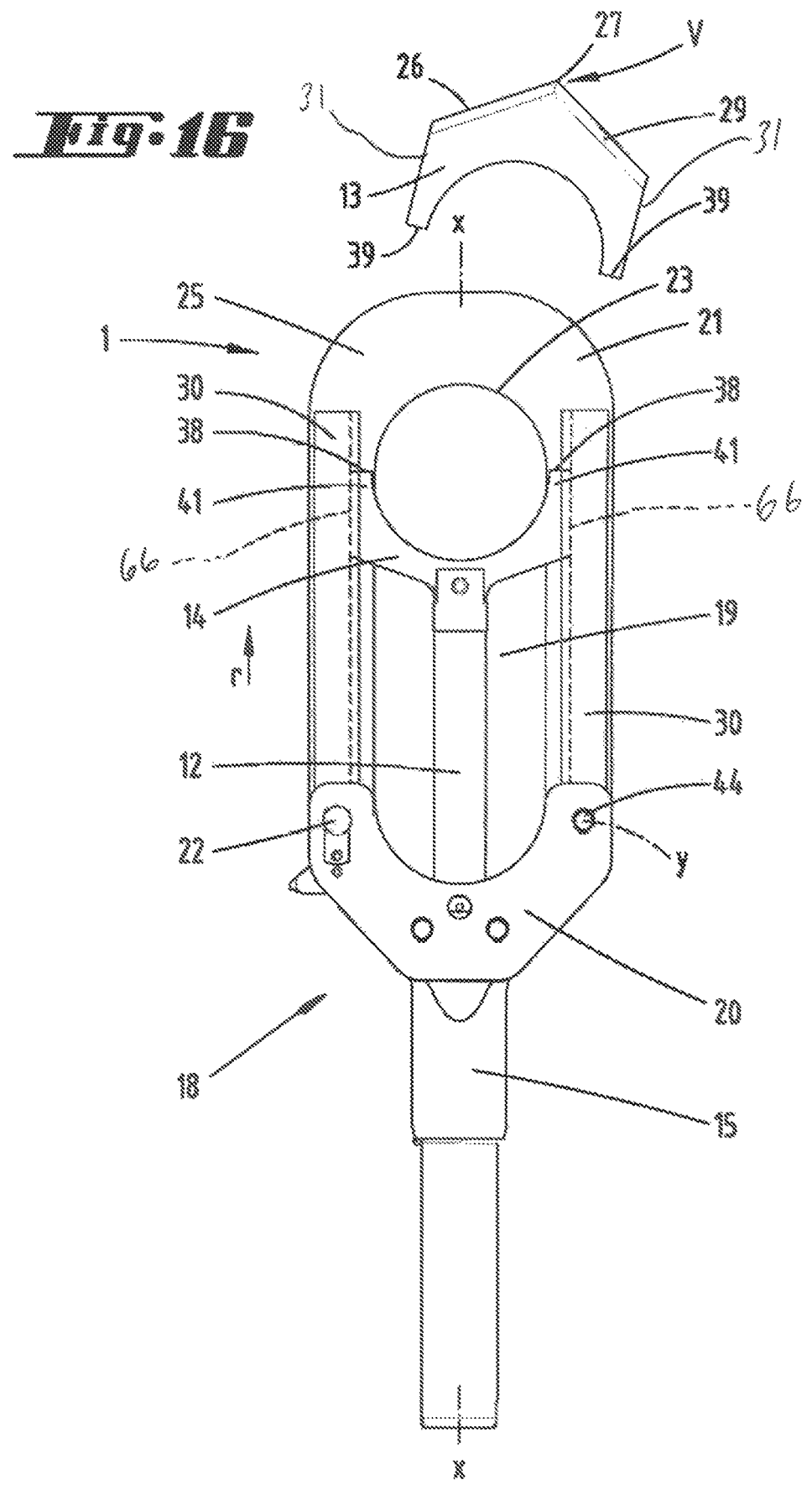
Figure 16A:
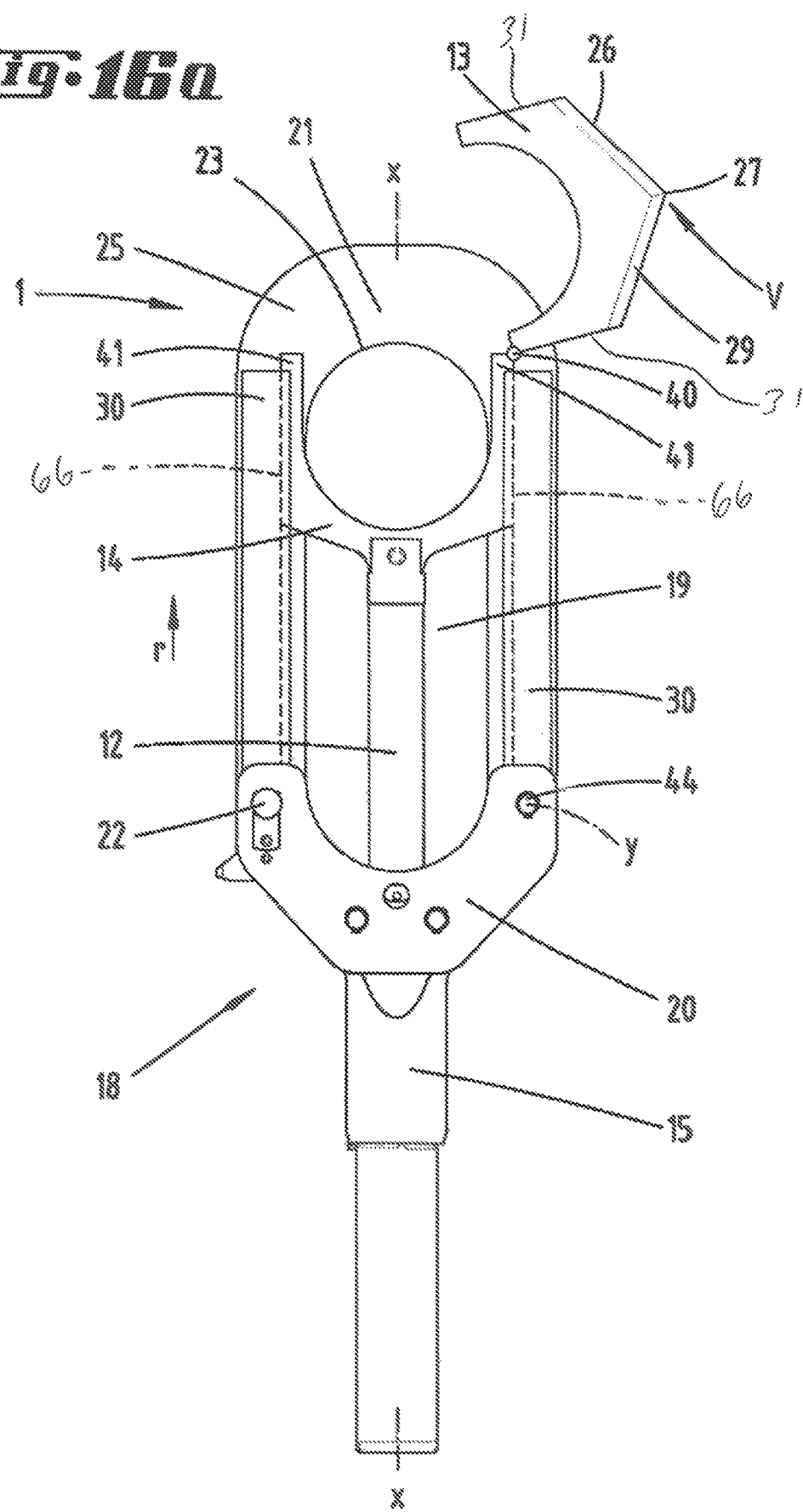
FIG. 16a shows an illustration corresponding to FIG. 16, relating to an alternative formation.

The cutting edge 13 can also be moved in the traversing direction r along channels 66 only indirectly via an advancement part 14 (see FIGS. 14 to 16). The advancement part 14 is connected directly to the piston shaft 12 and is designed in a fork-shaped manner, viewed in the traversing direction r. The cutting edge 13, which, facing the advancement part 14, is also formed in a fork-shaped manner with corresponding front surfaces 39, is supported on the front surfaces 38 of the fork ends 41. The front surfaces 38 and 39 of advancement part 14 and cutting edge 13 form stop surfaces. The outer side edges 31 of the cutting edge 13 seat within the channels 66 and slide along the channels 66.

In the contact position, an opening 32 results due to the two fork-shaped designs, which can be adapted to the receiving contour 23 of the holding part 21 with respect to contour and size, furthermore adapted to the workpiece 24 to be cut. An opening 32 comprising a circular disk-shaped opening surface thus results for cutting a tubular workpiece.

Due to this design, the cutting edge 13 can be removed from the tool head 18 after completely performed cutting process, because said cutting edge is exposed on the other side of the workpiece 24, optionally also between holding part 21 and guide parts 30 (see FIGS. 15 and 16).

After returning the advancement part 14, the cutting edge 13 can be used again for a next cutting process.

The cutting edge 13 can furthermore be connected to the advancement part 14 in a captive manner via a flexible band or chain, wherein the length of the band or of the chain provides for the above-described removal of the cutting edge 13. In this respect, the cutting edge 13 can additionally or alternatively be connected to the advancement part 14 via a joint 40 (see FIG. 16a), via which the cutting edge 13 can be brought into a position, which is pivoted away, after passing through openings 68 at the ends of the channels 66, see FIG. 14, and completely passing through the workpiece 24. The pivoting can be attained, for example, solely by or supported by gravity.

Figure 20:
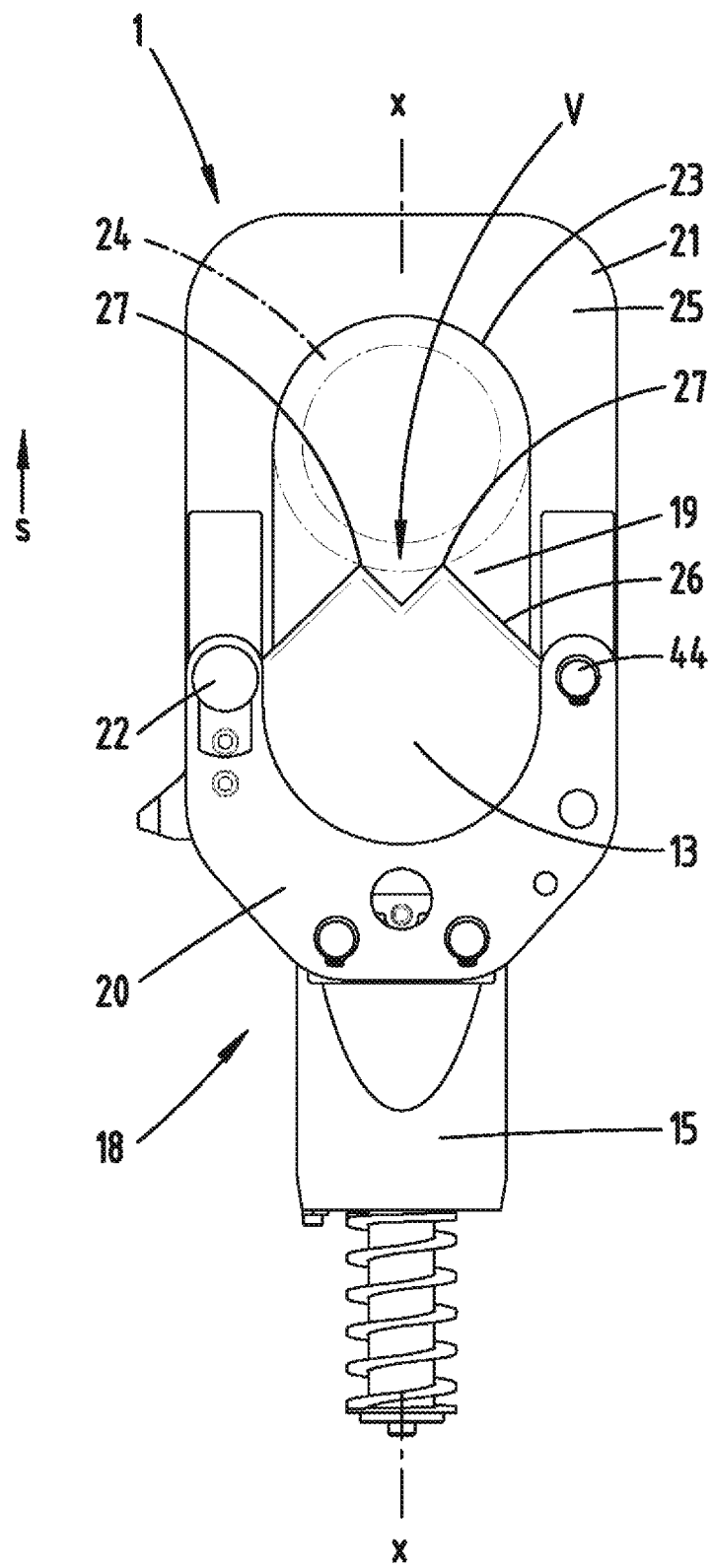
FIG. 20 shows the tool in an illustration according to FIG. 2, relating to an alternative embodiment.
Figure 29:
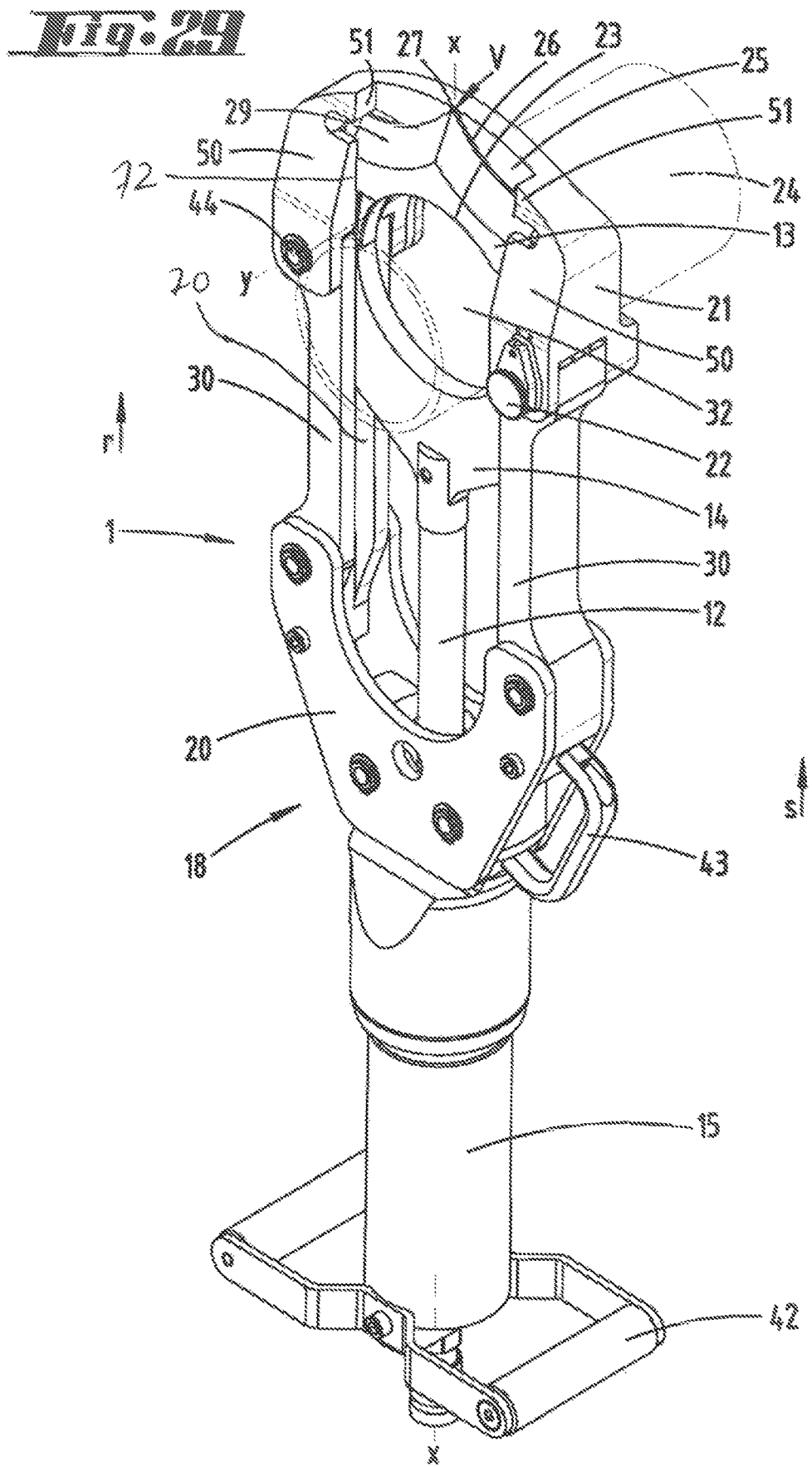
FIG. 29 shows the tool in perspective illustration, relating to a further embodiment.

As can be seen from the illustration in FIG. 20, the cutting edge 13 can also be provided with two protrusion regions V or two cutting edge tips 27, respectively, which each protrude freely beyond the convex contour. The cutting edge tips are preferably arranged symmetrically to the central longitudinal axis x, which, in the case of a sliding jaw formation of this type, simultaneously also corresponds to the traversing line.

While the tool head 18 is formed in a sliding jaw-like manner in the embodiments illustrated in FIGS. 1 to 20, the illustrations of FIGS. 21 to 28 show formations of the tool head comprising pivot jaws.

The first pivot jaw 33 and the second pivot jaw 34 can be pivoted about a common pivot axis z, which pivot axis z is aligned transversely to the central longitudinal axis x and intersects the latter.

The pivotably movable pivot jaws 33 and 34 are in each case connected to the piston shaft 12 of the base unit 2 via a control rod 35, which is eccentrically articulated to the pivot jaws 33 or 34, respectively, in particular in the case of preferably essentially symmetrical arrangement of the pivot jaws 33 and 34 relative to the central longitudinal axis x.

The geometric pivot axes of the articulated connection of each control rod 35 to the pivot jaw 33, 34, as well as to the piston shaft 12, extends so as to be aligned parallel to the pivot axis z of the two pivot jaws 33 and 34.

The pivot axis z of the pivot jaws 33 and 34 form a pivot bolt 36, which is supported in the cylinder section 15 of the base unit 2.

The second pivot jaw 34 has the receiving contour 23, which is also formed as concave depression, in particular approximately semi-circular recess, in this embodiment. In the open position of the tool head 18 according to the illustration in FIG. 21, the contour opens in the direction of the central longitudinal axis x.

Based on the pivot connection of the pivot jaw 34 to the pivot bolt 36, the receiving contour 23 is limited in its extension on both sides by means of an end of the pivot jaw 34 close to the axis, and a radially outer end 37 of the pivot jaw 34 distant from the axis, based on the pivot axis z.

The opposite first pivot jaw 33 facing the receiving contour 23, is provided with a convex contour K, which, in the illustrated embodiments, is further formed as cutting edge 13, comprising a protrusion region V, which forms a cutting edge tip 27. In the course of a pivot displacement of the pivot jaw 33, which is effected via the base unit 2, the cutting edge tip 27 moves along a traversing line, which corresponds essentially to a circular arc a, comprising a center in the pivot axis z.

In the course of the forward displacement of the piston 10 on the unit side, both pivot jaws 33 and 34 are pivotably displaced towards one another simultaneously and evenly via the same circular arc a.

The second pivot jaw 34 thereby reaches an intermediate position according to the illustration in FIG. 24, in which the free end 37 thereof comes into contact with the central longitudinal axis x. In contrast to this central longitudinal axis x or a line spanning the free end 37 with the end close to the axis and the receiving contour 23, the region B, which is contacted first by the protrusion region V in the course of the further cutting movement, is displaced back by a backward displacement measure b, which, in the illustrated exemplary embodiment, corresponds approximately to half the free opening measure c of the concave receiving contour 23 between the free end 37 and the end close to the axis.

In the contact position of protrusion region V or cutting edge tip 27, respectively, and contact region B of the receiving contour 23 according to the illustration in FIGS. 25 and 26, clearances F result between the knife edge 26 and the receiving contour 23 on both sides perpendicular to the traversing direction r. After a further displacement of the cutting edge 13 for severing the workpiece 24, these clearances F can be closed completely by the first pivot jaw 33.

The second pivot jaw 34 has a broadside, which serves as traversing surface 25 for the first pivot jaw 33.

The backward displacement of the pivot jaws 33 and 34 into the open initial position takes place, as also in the case of the slide jaw solution, by backward displacement of the driving piston 10 by entraining the pivot jaws 33 and 34 via the control rods 35.

According to the schematic illustration in FIG. 28, the protrusion region V can also be formed by a plurality of cutting edge tips 27 in the case of a design with pivot jaws 33 and 34. A solution with two cutting edge tips 27, which can be arranged symmetrically to the traversing line, is illustrated. According to a possible formation, both cutting edge tips 27 can simultaneously hit the outer jacket surface of the workpiece to be cut 211 workpiece 24 to be cut in the course of the pivoting, can thus simultaneously cut into the material of the workpiece wall in response to a further displacement.

One of the pivot jaws can also be formed as fixed jaw, for example with a receiving contour, while the other jaw is formed as pivot jaw, preferably having a convex contour in the form of a cutting edge comprising a protrusion region, for example in the form of a cutting edge tip.

FIGS. 29 to 39 show a further embodiment of the tool 1.

As can be seen, this tool is provided with a handle 42 in the region of the cylinder section 15 for connecting the tool 1 to a base unit 2. A further handle 43 is arranged in the region of the base holding part 20.

In this embodiment, the base holding part 20 also supports guide parts 30 on both sides of the advancement part 14, which can be displaced in the traversing direction r. With reference to a cross section transversely to the longitudinal extension of the guide parts 30, these guide parts 30 are designed essentially in a U-shaped manner comprising U-openings facing one another to define a channel 70 in each guide part 30. The advancement part 14, which can be displaced via the piston shaft 12, and the cutting edge 13 are guided linearly between these guide parts 30.

A bracket-like holding part 21, which essentially offers the receiving contour 23, is also arranged here on the end side of the guide parts 30.

Compared to the base holding part 20 or the guide parts 30, which are firmly arranged on the base holding part 20, respectively, the holding part 21 is held so as to be capable of being pivoted away. In this embodiment, the corresponding pivot axis y also extends transversely to the central longitudinal axis x and perpendicular to the workspace 19, which is spanned between holding part 21 and the guide parts 30.

The articulation occurs in the region of a free end of a guide part 30, which faces away from the base holding part 20, wherein the pivot connection is provided by means of a correspondingly positioned bolt 44. The pivot connection, which is provided in this way, can preferably not be operationally released.

Located opposite to the bolt 44, the corresponding end of the holding part 21 can be secured via a further bolt 22 to the free end of the corresponding guide part 30. As can in particular be seen from the sectional illustration in FIG. 38, this is a bolt 22, which can be secured by means of locking, which can be pulled out of the corresponding bore 45 in the holding part 21 and the bore 46 in the guide part 30 in the direction of its longitudinal extension to release the connection between holding part 21 and guide part 30.

Figure 35:
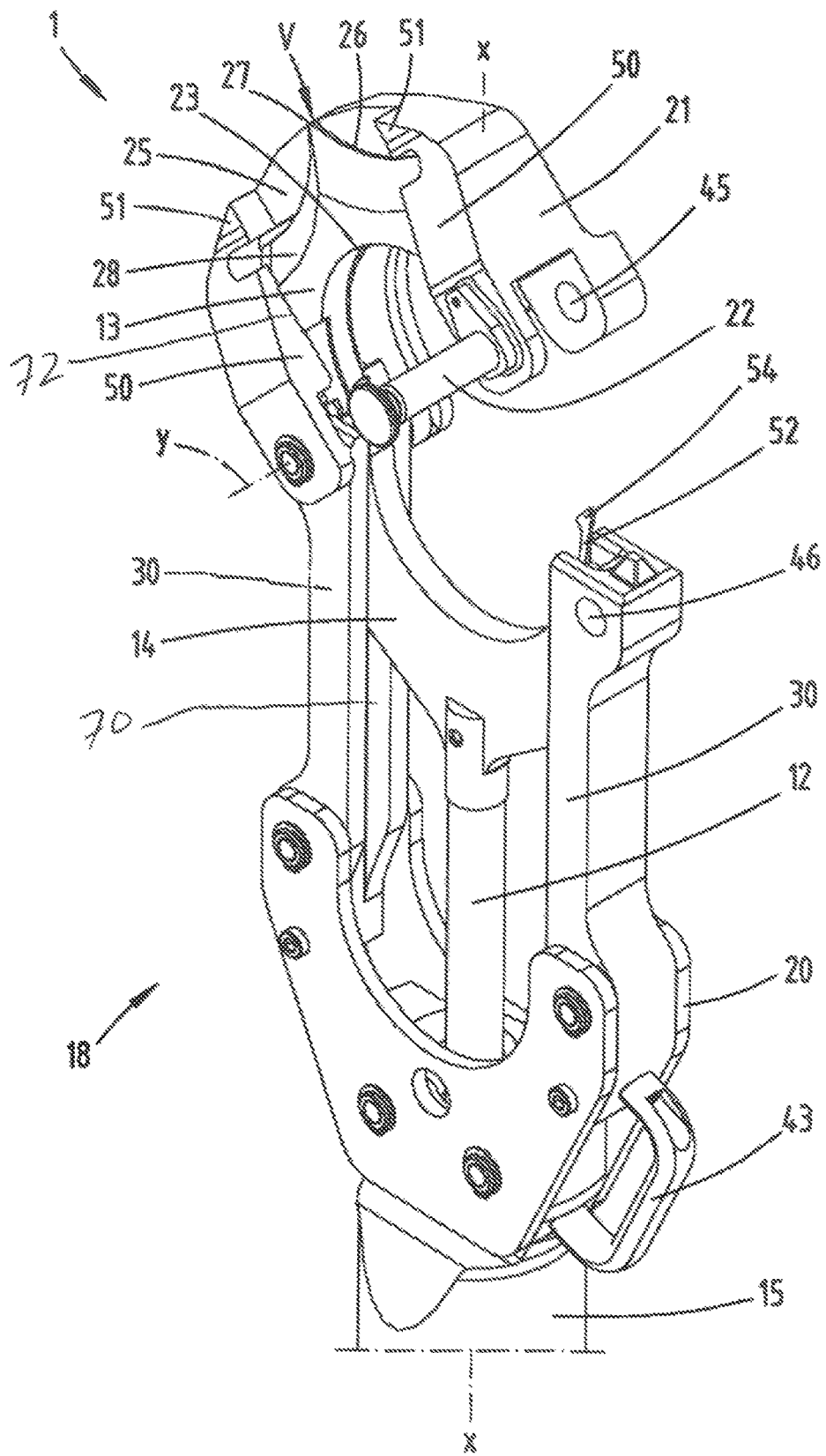
FIG. 35 shows the tool in a situation according to FIG. 34 in perspective illustration.
Figure 38:
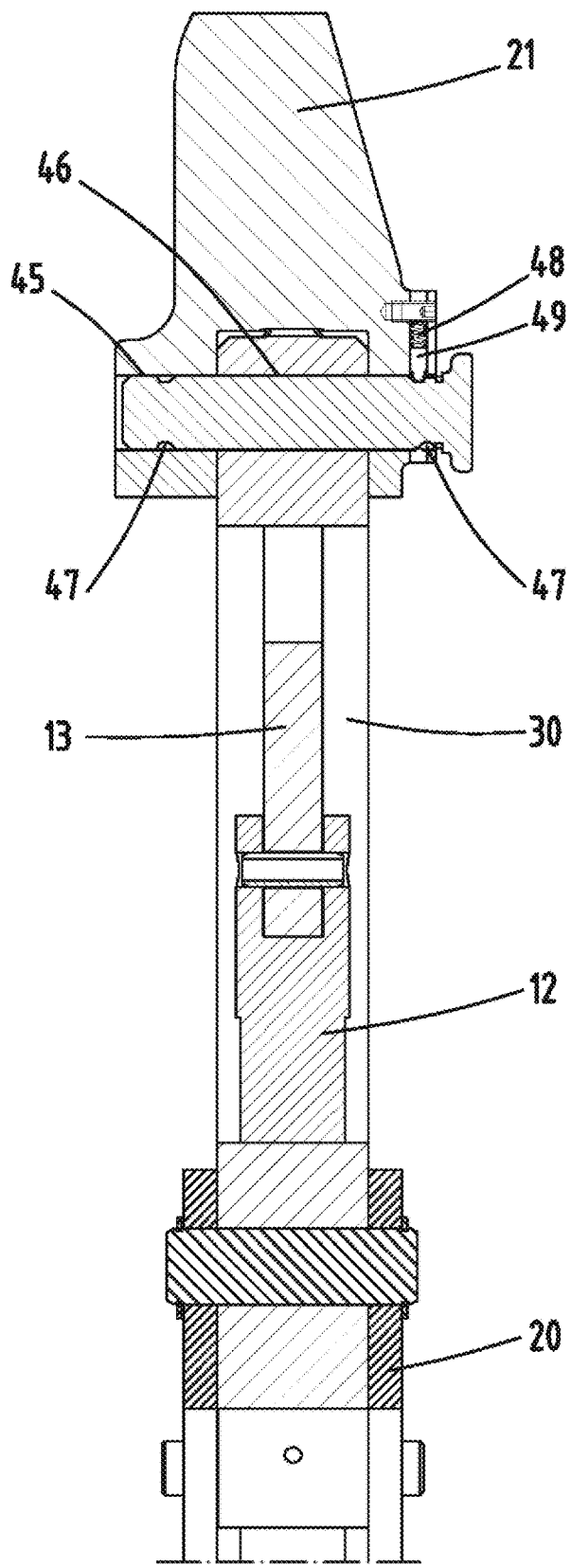
FIG. 38 shows the section XXXVIII-XXXVIII in FIG. 30, which is illustrated in an enlarged manner.
Figure 39:
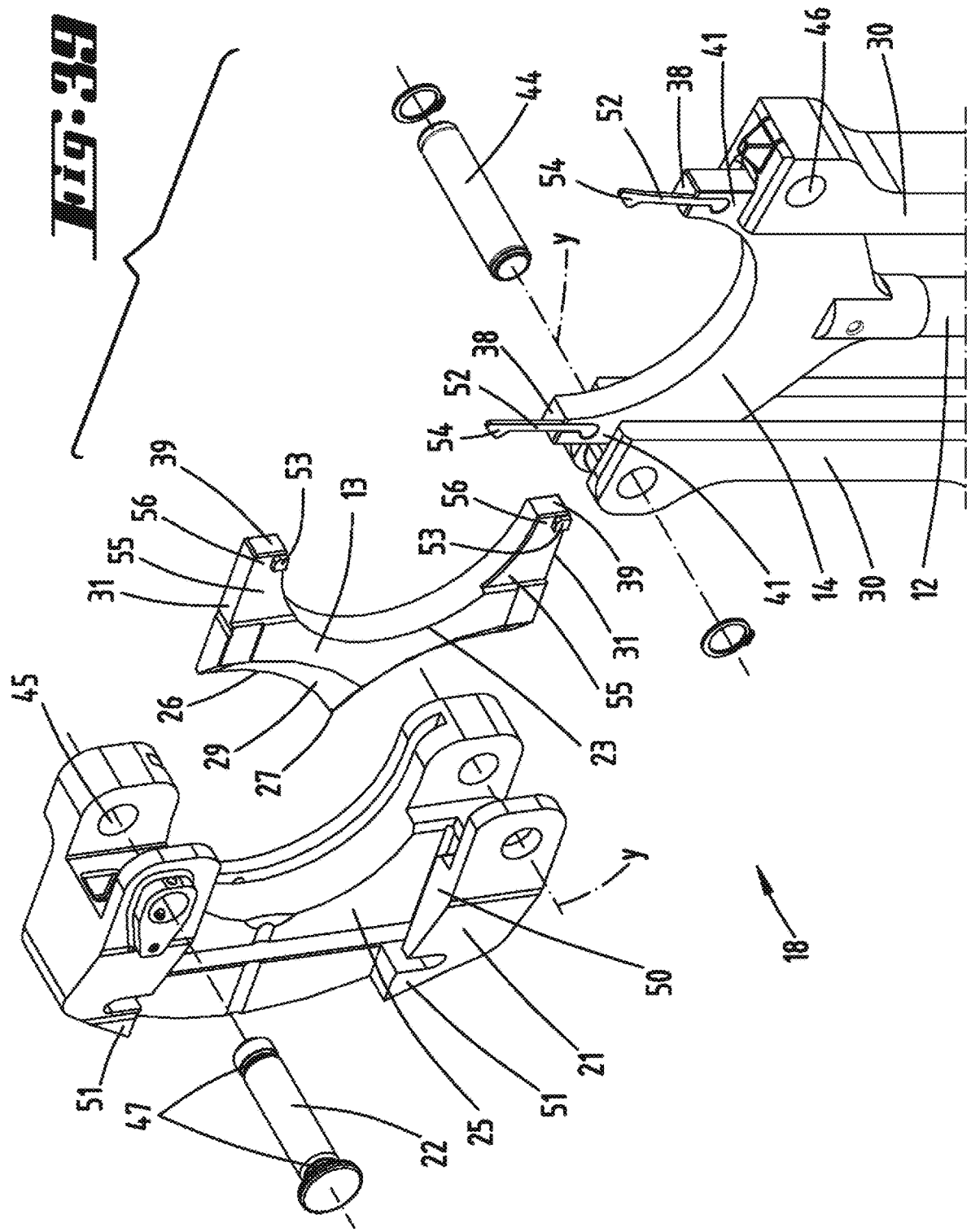
FIG. 39 shows the holding head of the tool according to the embodiment in FIG. 29 in perspective exploded illustration.

The securing position of the holding part 21 illustrated in FIG. 38 as well as the release position for pivoting the holding part 21 illustrated for example in FIG. 35, can in each case be secured by means of locking with respect to the bolt 22. For this purpose, the bolt 22 has two annular grooves 47, which are spaced apart from one another in the axial direction of said bolt, and into which a locking protrusion 49 dips, which is received in the holding part 21 and which acts against a spring 48 there, depending on the final position of the bolt 22.

In extension to the guide parts 30 of the base holding part 20, the holding part 21 is essentially provided with guide sections 50, which are preferably also essentially U-shaped in the cross section to define a channel 72 in each guide section 50 and which, when the cutting edge 13 is displaced forward in the cutting direction s, receive said cutting edge 13 or accept it from the base holding part 20, which has the guide parts 30, respectively. In the cutting edge end position according to the illustrations in FIGS. 29 to 33, the cutting edge 13 is preferably located completely in the holding part 21 between the guide sections 50 thereof. The cutting edge end position can be stop-limited, for example as a result of correspondingly formed stop ribs 51 on the end side of the guide sections 50.

In this embodiment, the advancement part 14 also displaces the cutting edge 13 via the front surfaces 38 thereof in the region of the fork ends 41. A complete separation of cutting edge 13 and advancement part 14 is present in this respect. Only the front surfaces 38 and 39 of advancement part 14 and cutting edge 13 abut on one another in particular in the course of the movement in the cutting direction s.

Figure 34:
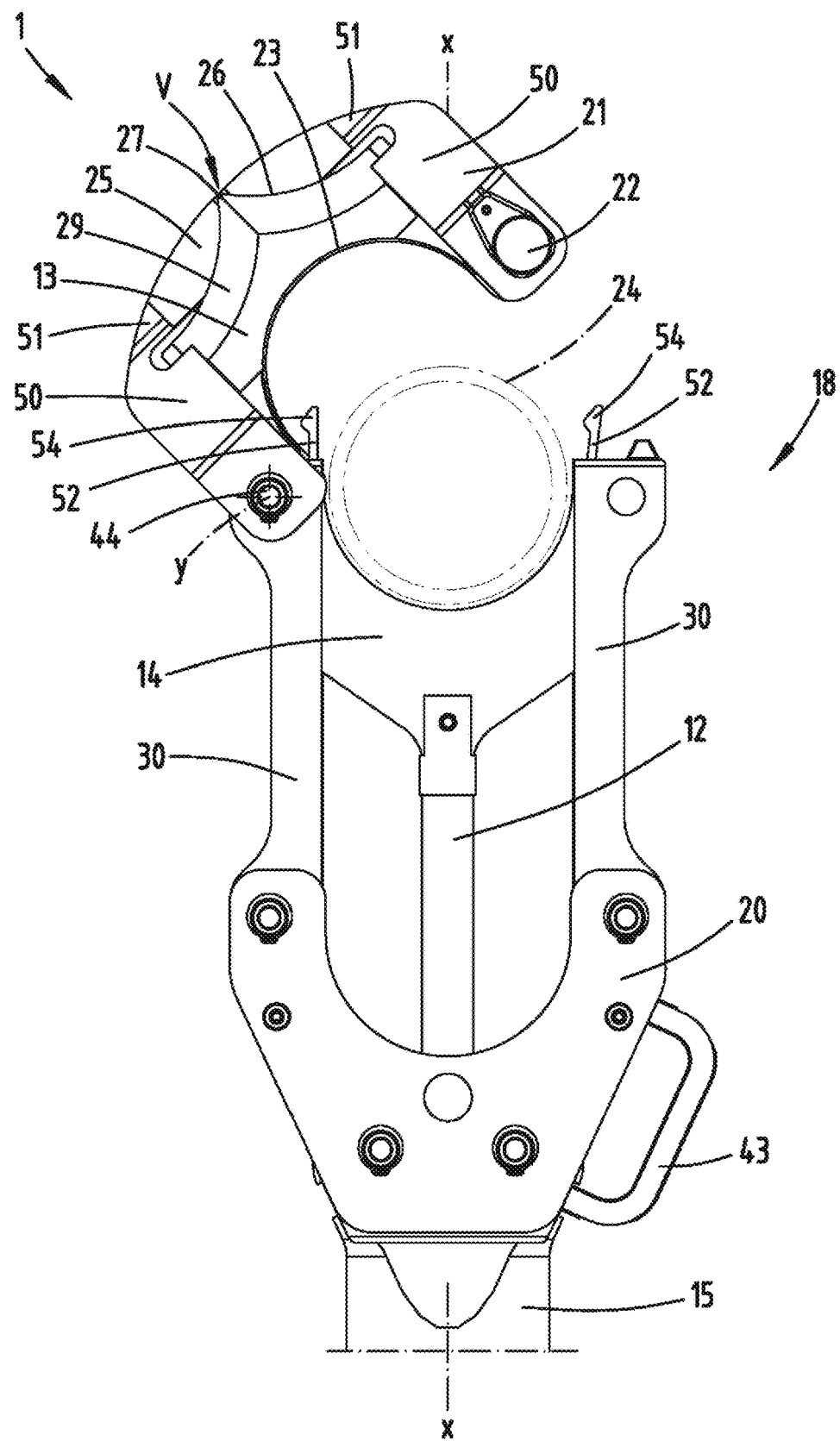
FIG. 34 shows the tool head of the tool in a view according to FIG. 30, relating to a pivoted-away position of a holding part with cutting edge received therein.

In the cutting edge end position, the holding part 21 can be pivoted away about the pivot axis y according to the illustrations in FIGS. 34 and 35, while further holding the cutting edge 13, which is received in the channels 70 of the holding part 21. The workspace 19 is subsequently exposed, for example for removing the workpiece 24. The advancement part 14 can also be displaced back from this position, thus without entrainment of the cutting edge 13 by means of dragging.

In view of ease of handling, an automatic entrainment of the cutting edge 13 from the cutting edge end position back into the initial position is more favorable. This entrainment by means of dragging occurs via the advancement part 14, which can be displaced backward, controlled by the unit.

To prevent damages to the tool 1, in particular to the cutting edge 13, but furthermore also to the workpiece 24, for example in the case of a possible jamming in the region of the cutting edge 13 and of the severed workpiece 24, this entrainment by means of dragging is designed so as to be capable of being disengaged, so that, when exceeding a predetermined force acting on the locking connection, the latter triggers, whereupon the advancement part 14 moves back by releasing the connection to the cutting edge 13, and the cutting edge 13 thus remains in the holding part 21 according to the described exemplary embodiment. As described above, said holding part can then be pivoted away to expose the workpiece 24.

The locking connection is at hand as a result of the arrangement of a locking arm 52 and of a counter locking means 53.

In the illustrated exemplary embodiment, a locking arm 52 is in each case connected on both sides of the central longitudinal axis x in the region of the corresponding fork ends 41 of the advancement part 14 with respect to a cross section, in which the central longitudinal axis x is illustrated as a line and the pivot axis y is illustrated as a point. This can be a plastic injection molded part, which is anchored in the advancement part 14. In the alternative, the locking arm 52 can also be made of a spring steel or the like.

The locking arm 52 protrudes freely beyond the front surface 38 of the assigned fork end 41 and forms a locking protrusion 54 on the end side. In the illustrated exemplary embodiment, the two locking protrusions 54 of both locking arms 52 face in the same direction. In the alternative, both locking protrusions 54 can also be arranged so as to face one another or, as a further alternative, can face away from one another.

The locking arms 52 in each protrude with their locking protrusions 54 into a pocket-like clearance 55 of the cutting edge 13, which allows for a pivotability of the respective locking arm 52 transversely to its longitudinal extension, further preferably also transversely to the central longitudinal axis x. An evasive movement of this type of the locking arm 52 can be reset elastically due to the selected material of the locking arm 52.

An aperture 56 for the locking arm 52 is provided in the region of the cutting edge-side front surface 39, which comes to rest on the advancement part-side front surface 38, in the course of the advancement movement in the cutting direction s. Said aperture thus leads into the clearance 55.

The region in the front surface 39, which remains adjacent to the aperture 56 in the cross section, forms the counter locking means 53.

Figure 36:
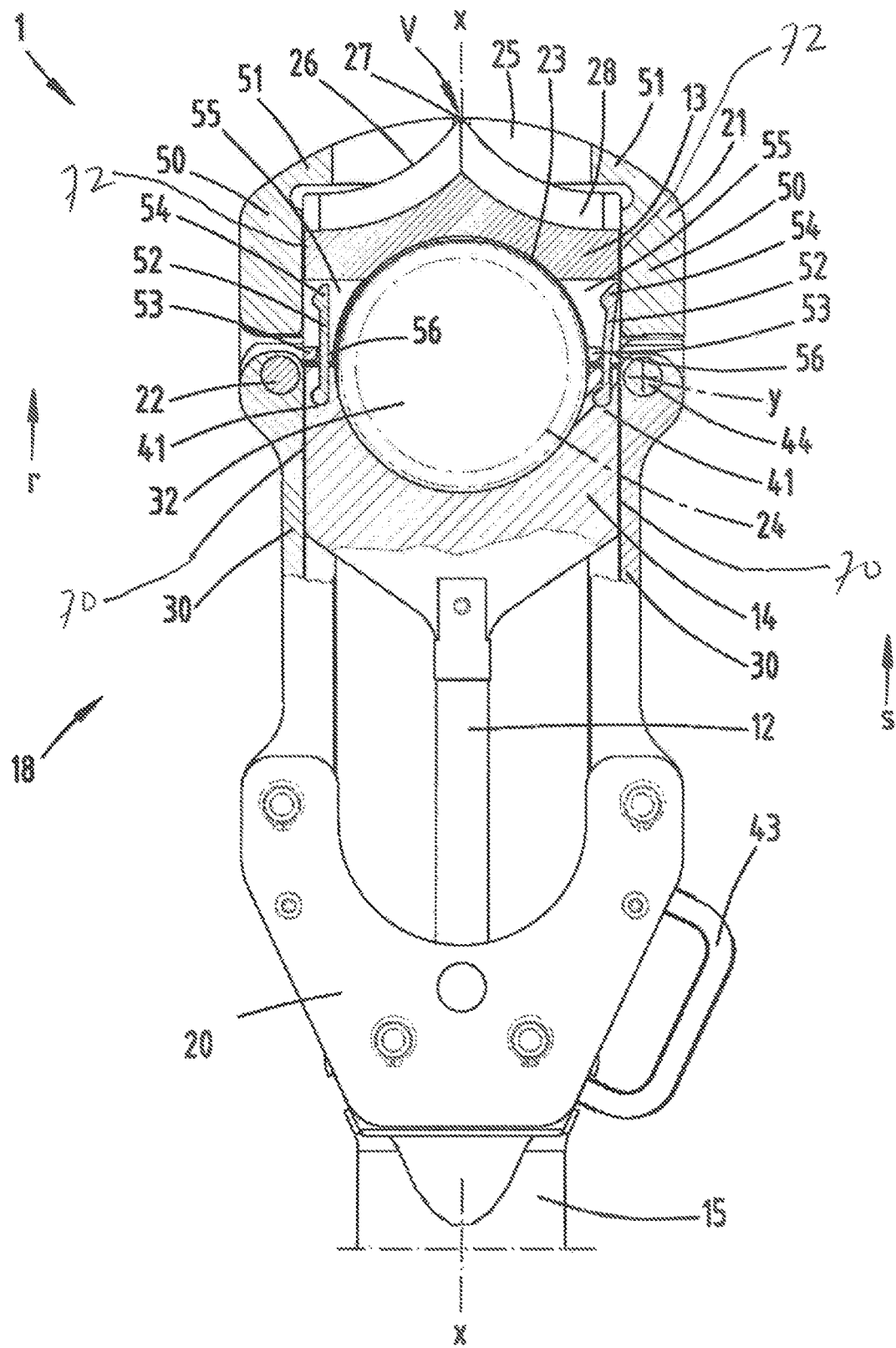
FIG. 36 shows the section according to line XXXVI-XXXVI in FIG. 33, relating to a final cutting edge position.
Figure 31:
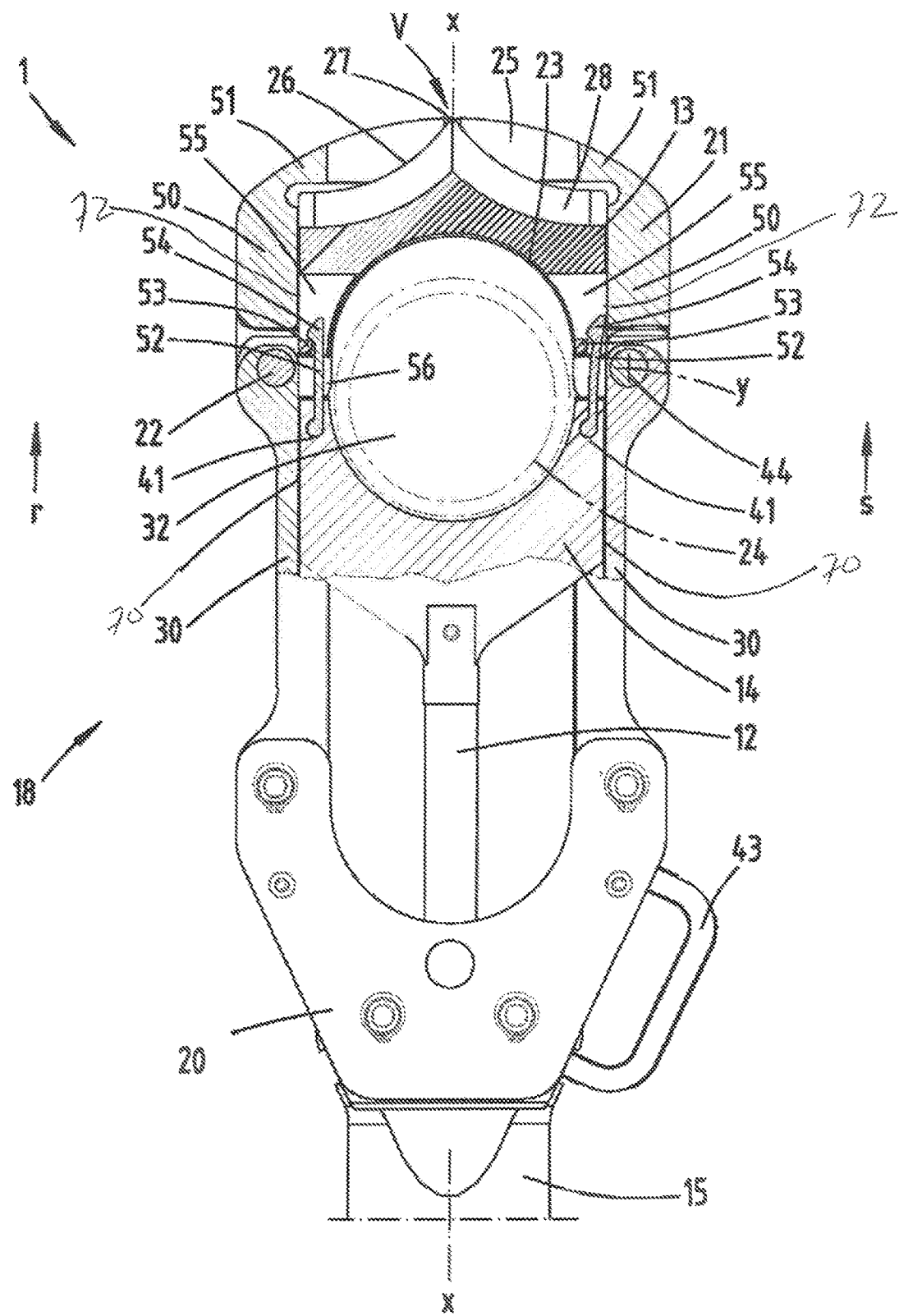
FIG. 31 shows the tool in a further view.

As described, a linear backward displacement of the advancement part 14 takes place from the cutting edge end position, for example according to FIG. 36. Due to the spacing between counter locking means 53 of the cutting edge 13 and locking protrusion 54 of the advancement part-side locking arm 52, which is present in the displacement direction, a relative displacement of the advancement part 14 with respect to the cutting edge 13 initially results thereby, which cutting edge initially remains in the holding part 21 so as not to be displaced, until the locking protrusions 54 move against the counter locking means 53 (see FIG. 37). In the backward displacement, the advancement part 14 thus initially leads. A distancing of cutting edge 13 and advancement part 14 results in this position in the displacement direction and thus an enlargement, at least viewed in this direction, of the opening 32, which is formed as whole by advancement part 14 and cutting edge 13 and with which the workpiece 24 optionally still partially engages. Only this distancing can be sufficient to eliminate a jamming, which may be present, between workpiece 24 and cutting edge 13 and/or advancement part 14.

As a result of further backward displacement of the advancement part 14, the cutting edge 13 is also entrained via the locking arms 52 and the counter locking means 53, provided that a force retaining the cutting edge 13, for example a jamming in the region of the workpiece 24, is not so large that the locking connection is released. In this case, the locking protrusions 54 glide on and past the counter locking means 53 by correspondingly pivoting out the locking arms 52, whereupon the locking connection is released. The advancement part 14 alone moves back into the initial position in this case, while the cutting edge 13 remains in the holding part 21 for the separate treatment. The holding part 21 can thus be pivoted away with the cutting edge 13.

In the position, in which the holding part 21 is pivoted away, the cutting edge 13 can moreover be removed from the holding part 21 for cleaning or replacement purposes. The cutting edge 13 can thus be replaced, for example, with a cutting edge without tip or with a cutting edge for in particular cutting plastic pipes or the like.

The locking position between advancement part 14 and cutting edge 13 can moreover be found automatically. The locking protrusions 54 are suitable to bypass the counter locking means 53 even in the advancement direction and to engage behind them by dipping into the clearance 55.

A pivoting away of the holding part 21 can also take place from the locking position according to FIG. 36, optionally also according to FIG. 37. In the course of the pivoting away, the locking arms 52 deflect elastically and finally appear through the front surface-side apertures 56.

Figure 43:
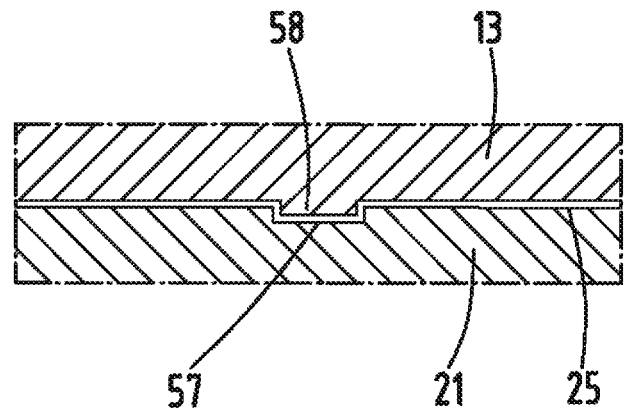
FIG. 43 shows an enlarged sectional illustration according to line XLIII-XLIII in FIG. 41.

In the region of the holding part-side traversing surface 25, a counter guide means 57 in the form of a depression or groove, respectively, can be at hand in the center, for cooperation with a guide means 58 of the cutting edge 13. As can be seen, for example, in FIG. 43, this guide means 58 can be a rib-like protrusion, which is adapted to the cross section of the counter guide means 57 and which, from the receiving contour 23, can extend all the way to an optionally formed cutting edge tip 27 (see also FIG. 40). As a result of this design, a correct alignment of the cutting edge 13 is at hand in the course of moving into the holding part 21, also if a certain deflection of the cutting edge 13 should occur beforehand in the transverse direction to the cutting direction s in the course of the cutting process.

Figure 44:
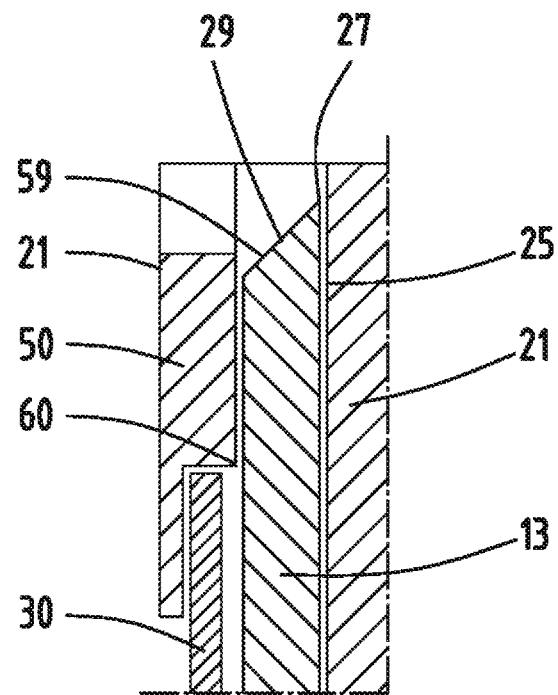
FIG. 44 shows the section according to line XLIV-XLIV in FIG. 41, which is illustrated in an enlarged manner.

As illustrated in FIG. 44, the cutting edge 13 can furthermore have a positioning means 59, which, in the illustrated exemplary embodiment, can also be formed by the cutting edge section 29. The positioning means 59 extends transversely to the cutting direction s and also transversely to a width direction d of the cutting edge 13 and cooperates with a counter positioning means 60, which is formed in the region of the guide part 30 and/or of the guide section 50, in particular in the course of the displacement of the cutting edge 13 in the cutting direction s. In cooperation with the formation of the positioning means 59 in a run-on bevel-like manner, the counter positioning means 60, for example in the form of a protrusion section, viewed in the cross section according to FIG. 44, leads to a correct alignment of the cutting edge 13 perpendicular to the width direction d of the cutting edge 13, so that, in preferred design, said cutting edge comes to rest on the traversing surface 25 of the holding part 21. A cutting edge 13, which had previously optionally been displaced or pushed out in the course of the cutting process, can thus be inserted into the pocket-like receptacle in the guide section 50 in a suitable manner.

Figure 40:
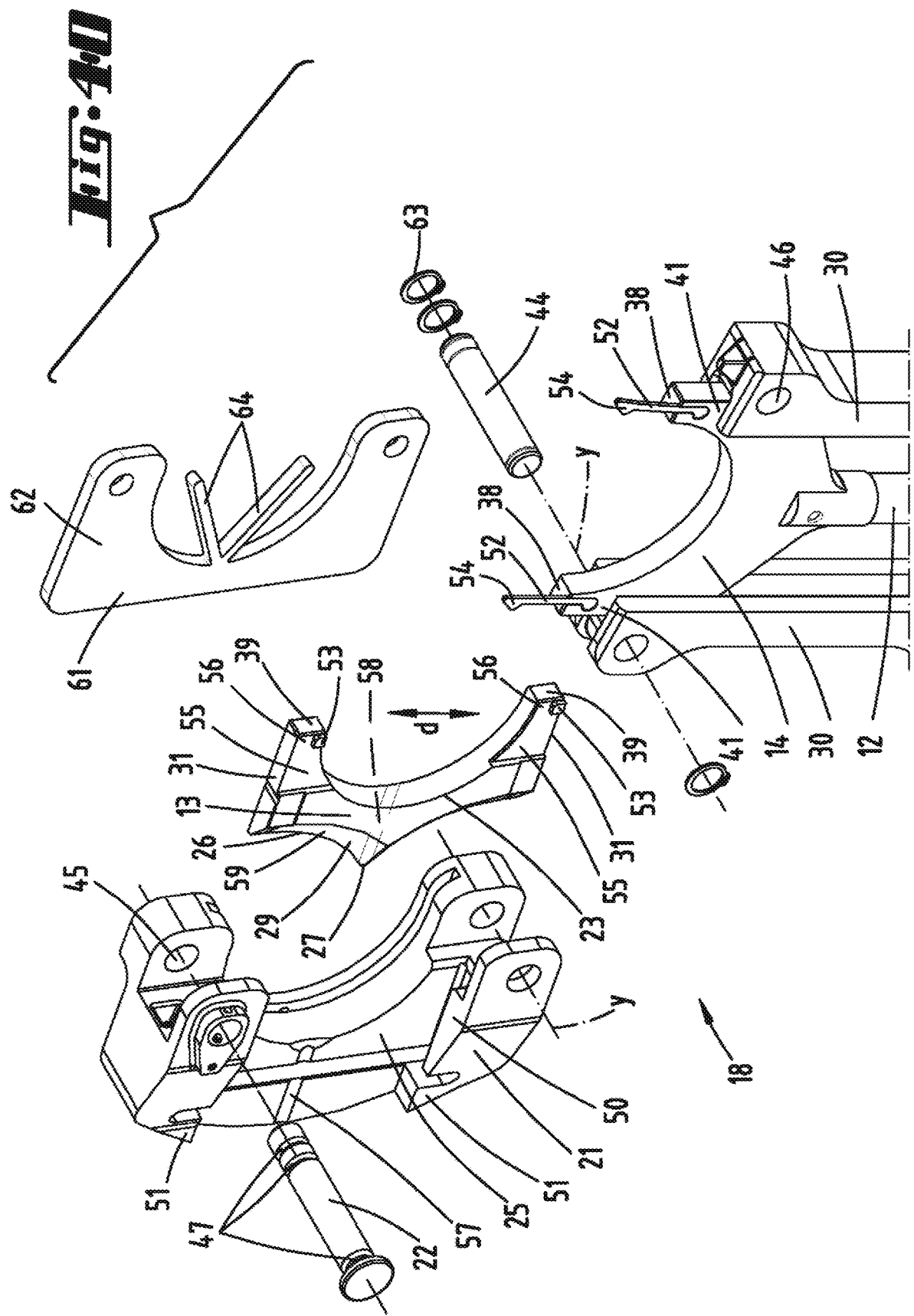
FIG. 40 shows an illustration corresponding to FIG. 39, relating to a further embodiment.
Figure 41:
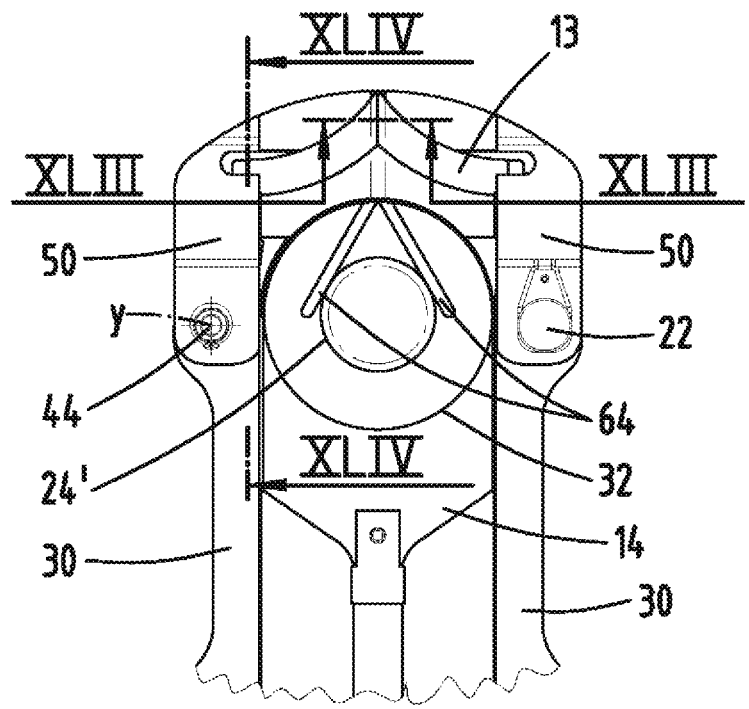
FIG. 41 shows an elevation illustration according to FIG. 30, relating to the embodiment according to FIG. 40.
Figure 42:
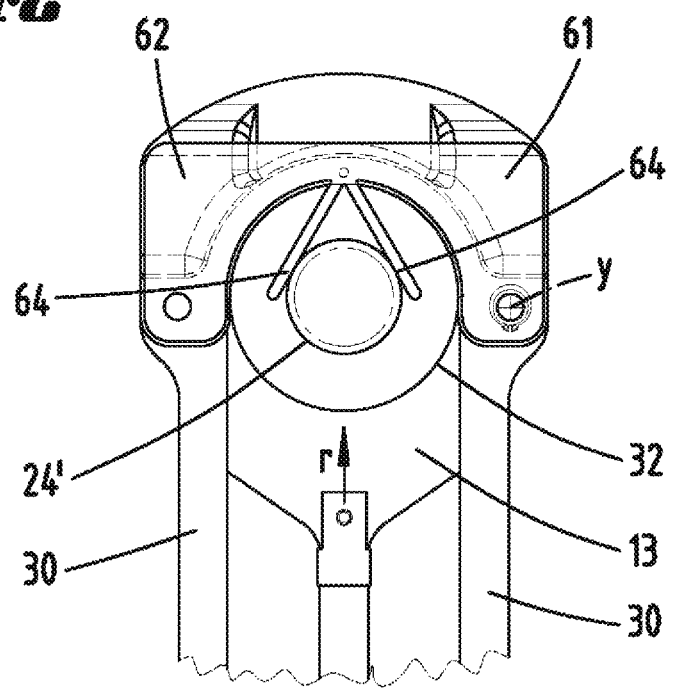
FIG. 42 shows an elevation illustration essentially corresponding to FIG. 31, relating to the embodiment according to FIG. 40.

As can further be seen in particular from the illustrations in FIGS. 40 to 42, a positioning part 61 can be assigned to the tool 1, here for example to the holding part 21. A positioning part 61 of this type can initially be present as loose part and can thus be arranged, if necessary.

The positioning part 61 can thereby have a plate-shaped base body 62, optionally comprising a section, which is adapted to the receiving contour 23. In a region, the base body can be arranged, for example on the bolt 44, for example by using a further securing ring 63 only for securing the positioning part 61.

The other end of the positioning part 61 can be secured to the further bolt 22.

From the section, which is adapted to the receiving contour 23, two positioning arms 64, which are arranged essentially V-shaped to one another and which, in response to corresponding assignment of the positioning part 61, protrude into the projection surface of the opening 32, viewed perpendicular to the width direction d, extend into this section (see FIGS. 41 and 42). A centrical support for workpieces 24, which have a reduced diameter as compared to the formation of the receiving contour 23, such as, for example pipes with a reduced diameter (see workpiece 24' in FIG. 42), results from this in an advantageous manner.

The above explanations serve to describe the inventions, which are captured as a whole by the application and which further develop the prior art at least by means of the following feature combinations, in each case also independently, wherein two, a plurality of, or all of these feature combinations can also be combined, namely:

A tool 1, which is characterized in that a received workpiece 24 can be passed through completely and that, from a position of the cutting edge, which is reached as a result of the complete pass-through, the cutting edge can be moved from the cutting direction by removal from the advancement part.

A tool 1, which is characterized in that, in response to a first contact, which is at hand in a projection, of the cutting edge tip 27 with a concavely curved region of the receiving contour 23, a clearance F remains on one or both sides, based on an extension of the knife edge 26 perpendicular to the displacement direction of the cutting edge 13, between the knife edge 26 and the receiving contour 23.

A tool 1, which is characterized in that, in response to a first contact of the central longitudinal axis x by the free end of the concave receiving contour 23, the region, which, when moving into the protrusion region, comes into contact with the receiving contour 23, is displaced back with respect to the free end by a backward displacement measure, which corresponds to one third or more of the free opening measure of the concave receiving contour 23, viewed perpendicular to the central longitudinal axis x.

A tool 1, which is characterized in that the cutting edge 13 can be removed from the tool head 18, from the position, which corresponds to the complete pass-through, and/or that the cutting edge 13 can be pivoted relative to the advancement part 14 by an axis, which runs perpendicular to the cutting direction.

A tool 1, which is characterized in that the cutting edge 13 is pivotably connected to the advancement part 14.

A tool 1, which is characterized in that the cutting edge 13 can be pivoted relative to the advancement part 14 by means of a holding part 21.

A tool 1, which is characterized in that the advancement part 14 is connected to the cutting edge 13 by means of locking in a releasable manner.

A tool 1, which is characterized in that the locking connection has a locking arm 52, which allows for a distancing of the advancement part 14 to the cutting edge 13 without releasing the locking connection.

A tool 1, which is characterized in that when the cutting edge 13 is acted on by the advancement part 14, the force transmission takes place via a stop surface, which is formed separately from the locking arm 52, and that two locking arms 52 are provided.

A tool 1, which is characterized in that the locking arms 52 are formed so as to be located opposed transversely to the cutting direction s with respect to an opening of the receiving contour 23.

A tool 1, which is characterized in that the cutting edge 13, assigned to a central region, which is present based on a direction transversely to the cutting direction s, has a guide means 58, which can cooperate with a counter guide means 57 of the holding part 21.

A tool 1, which is characterized in that, transversely to the cutting direction s and based on a width of the cutting edge 13 also transversely to the width direction d of the cutting edge 13, the cutting edge 13 has a positioning means 59, which can cooperate with a counter positioning means 60 of the holding part 21.

A tool 1, which is characterized in that a positioning means 61 can be fastened to the holding part 21 for aligning workpieces 24, 24' of smaller diameters.

A tool 1, which is characterized in that the advancement part 14 is designed in a fork-shaped manner, comprising two fork ends acting on the cutting edge 13 outside of a cutting region of the cutting edge 13.

A tool 1, which is characterized in that the receiving contour 23 is formed on a holding part 21, which, based on a cross section, is formed in a side-by-side arrangement to the cutting edge 13.

A tool 1, which is characterized in that the holding part 21 forms a traversing surface 25 facing the cutting edge 13, on which, laterally bearing thereon, the cutting edge 13 moves relative to the holding part 21.

A tool 1, which is characterized in that the cutting edge 13 can be moved relative to the holding part 21 until the clearance or the clearances F are closed completely.

A tool 1, which is characterized in that the cutting edge 13 has one or a plurality of cutting edge tips 27.

A tool 1, which is characterized in that the one or plurality of cutting edge tips 27 are designed symmetrically to a traversing line of the cutting edge 13, which goes through the center of the receiving contour 23.

A tool 1, which is characterized in that in a longitudinal cross section through the cutting edge tip 27, the cutting edge 13 has a wedge-shaped section 29, originating from a planar lower surface 28 on one side.

A tool 1, which is characterized in that a guide part 30 is arranged on one side or on both sides on the traversing surface 25 of the holding part 21 in the width direction on the other side of an outer edge of the cutting edge 13 for the U-shaped enclosure of an edge region of the cutting edge 13.

A tool 1, which is characterized in that the holding part 21, together with the cutting edge 13, forms a closed workspace 19 when performing a cutting process.

A tool 1, which is characterized in that the holding part 21 can be folded open for receiving a workpiece 24.

A tool 1, which is characterized in that the tool head 18 has two pivot jaws.

A tool 1, which is characterized in that a pivot jaw can be moved on a circular arc.

A tool 1, which is characterized in that in the case of two pivot jaws, both pivot jaws can be moved on a common circular arc.

A tool 1, which is characterized in that the convex contour is formed as cutting edge 13.

A tool 1, which is characterized in that the protrusion region is formed as cutting edge tip 27.

All of the disclosed features (alone, but also in combination with one another) are essential for the invention. The disclosure content of the corresponding/enclosed priority documents (copy of the prior application) is hereby also included in its entirety into the disclosure of the application, also for the purpose of adding features of these documents into claims of the present application. With their features, the subclaims, also without the features of a referenced claim, characterize independent inventive further developments of the prior art, in particular to file divisional applications on the basis of these claims. The invention specified in each claim can additionally have one or more of the features specified in the above description, in particular provided with reference numerals and/or specified in the list of reference numerals. The invention also relates to designs, in the case of which individual features, which are mentioned in the above description, are not realized, in particular insofar as they are discernibly expendable for the respective intended purpose or can be replaced by other technically identical means.

| | List of Reference Numerals |
|---|---|
| 1 | tool |
| 2 | base unit |
| 3 | accumulator |
| 4 | button |
| 5 | handle |
| 6 | handle |
| 7 | drive unit |
| 8 | hydraulic hose |
| 9 | cylinder |
| 10 | piston |
| 11 | radial seal |
| 12 | piston shaft |
| 13 | cutting edge |
| 14 | advancement part |
| 15 | cylinder section |
| 16 | stop wall |
| 17 | compression spring |
| 18 | tool head |
| 19 | workspace |
| 20 | base holding part |
| 21 | holding part |
| 22 | bolt |
| 23 | receiving contour |
| 24 | workpiece |
| 24' | workpiece |
| 25 | traversing surface |
| 26 | knife edge |
| 27 | cutting edge tip |
| 28 | lower surface |
| 29 | section |
| 30 | guide part |
| 31 | outer edge |
| 32 | opening |
| 33 | pivot jaw |
| 34 | pivot jaw |
| 35 | control rod |
| 36 | pivot bolt |
| 37 | end |
| 38 | front surface |
| 39 | front surface |
| 40 | joint |
| 41 | fork end |
| 42 | handle |
| 43 | handle |
| 44 | bolt |
| 45 | bore |
| 46 | bore |
| 47 | annular groove |
| 48 | spring |
| 49 | locking protrusion |
| 50 | guide section |
| 51 | stop rib |
| 52 | locking arm |
| 53 | counter locking means |
| 54 | locking protrusion |
| 55 | clearance |
| 56 | aperture |
| 57 | counter guide means |
| 58 | guide means |
| 59 | positioning means |
| 60 | counter positioning means |
| 61 | positioning part |
| 62 | base body |
| 63 | securing ring |
| 64 | positioning arm |
| a | circular arc |
| b | backward displacement measure |
| c | opening measure |
| d | width direction |
| r | traversing direction |
| s | cutting direction |
| x | central longitudinal axis |
| y | pivot axis |
| z | pivot axis |
| B | contact region |
| F | clearance |
| K | convex contour |
| V | protrusion region |

The invention claimed is:

1. A tool for cutting a workpiece, comprising:
   first and second guide parts and a base holding part, the first guide part defining a first channel and the second guide part defining a second channel;
   a holding part defining a workpiece receiving contour configured to receive the workpiece, the holding part having a first channel on a first side of the workpiece receiving contour and a second channel on a second opposite side of the workpiece receiving contour, the holding part being pivotally coupled to the first guide part such that the holding part is positionable in a first position relative to the guide parts in which the first channels are aligned, the second channels are aligned and a workspace is formed into which each of the first channels and each of the second channels opens, and a second pivoted position relative to the guide parts in which the first channels are not aligned and the second channels are not aligned;
   a movable cutting edge defining a cutting contour, wherein the cutting contour is configured to be received within the first and second channels of the guide parts and the first and second channels of the holding part and is further configured to pass by the workpiece receiving contour during a process of cutting the workpiece in a cutting direction; and
   a piston movably mounted between the guide parts, the cutting edge being engaged with the piston, wherein the cutting edge to moves along the first and second channels of the guide parts and thereafter moves along the first and second channels of the holding part upon movement of the piston relative to the guide parts when the holding part is positioned in the first position, and wherein the cutting edge is pivoted relative to the piston by pivoting the holding part into the second pivoted position when the cutting edge is seated within the channels of the holding part and the cutting contour is moved past the workpiece receiving contour of the holding part.

2. The tool according to claim 1, wherein the cutting edge is pivotable relative to the piston along an axis that extends perpendicular to the cutting direction.

3. The tool according to claim 1, wherein the piston is releasably connected to the cutting edge by a lock.

4. The tool according to claim 3, wherein the lock includes a locking arm extending from the piston and couplable to the cutting edge, wherein the piston is movable relative to the cutting edge without releasing the lock.

5. The tool according to claim 4, wherein the cutting edge includes a stop surface and the piston includes a stop surface which acts on the stop surface of the cutting edge, the stop surface of the piston being formed separately from the locking arm.

6. The tool according to claim 4, wherein two locking arms are provided and located opposed transversely to the cutting direction relative to an opening of the workpiece receiving contour.

7. The tool according to claim 1, wherein the cutting edge has a guide, and the holding part has a counter guide, the guide of the cutting edge being engageable with the counter guide of the holding part.

8. The tool according to claim 1, further comprising a positioner configured to be fastened to the holding part for aligning workpieces of smaller diameters.

9. The tool according to claim 1, wherein the piston has a fork-shape comprising two fork ends acting on the cutting edge outside of a cutting region of the cutting edge.

10. The tool according to claim 1, wherein the holding part defines a traversing surface which faces the cutting edge, wherein the cutting edge bears against the traversing surface and moves relative to the holding part.

11. The tool according to claim 1, wherein the holding part is pivotably fastened to the first guide part around a pivot axis which extends perpendicular to a central longitudinal axis of the guide parts.

12. The tool according to claim 11, wherein each of the guide parts forms a U-shape.

13. The tool according to claim 12, wherein the holding part is pivoted to the first position relative to the guide parts when performing a cutting process.

14. The tool according to claim 12, wherein the holding part is pivotable to the second position relative to the guide parts for receiving the workpiece.

15. The tool according to claim 1, wherein the cutting edge has one or a plurality of cutting edge tips.

16. The tool according to claim 15, wherein the one or plurality of cutting edge tips are designed symmetrically relative to a center of the workpiece receiving contour.

17. The tool according to claim 15, wherein the one or plurality of the cutting edge tips include a wedge-shaped section.

18. The tool according to claim 15, wherein the cutting edge includes a convex contour.

19. A tool for cutting a workpiece, comprising:
   a holding part and first and second guide parts, the holding part and the first and second guide parts defining a workpiece receiving contour configured to receive the workpiece, a first channel on a first side of the workpiece receiving contour and a second channel on a second opposite side of the workpiece receiving contour, wherein each channel has an open end;
   a movable cutting edge having a first side edge positioned within the first channel and an opposite second side edge positioned within the second channel, the cutting edge defining a cutting contour between the first and second side edges, wherein the first and second side edges of the cutting contour are configured to slide along the respective first and second channels, the cutting contour is configured to pass by the workpiece receiving contour and is configured to pass through the open ends of the first and second channels during a cutting process of cutting the workpiece in a cutting direction; and
   a plate configured to move the cutting edge relative to the first and second channels, wherein the cutting edge is pivotably connected to the plate, and wherein the cutting edge is pivotable relative to the plate once the cutting edge passes through the open ends of the first and second channels and moves past the workpiece receiving contour.

20. The tool according to claim 19, wherein the cutting edge is pivotable relative to the plate along an axis that extends perpendicular to the cutting direction.

21. The tool according to claim 19, wherein the plate is releasably connected to the cutting edge by a lock.

22. The tool according to claim 21, wherein the lock includes a locking arm extending from the plate and couplable to the cutting edge, wherein the plate is movable relative to the cutting edge without releasing the lock.

23. The tool according to claim 22, wherein the cutting edge includes a stop surface and the plate includes a stop surface which acts on the stop surface of the cutting edge, the stop surface of the plate being formed separately from the locking arm.

24. The tool according to claim 22, wherein two locking arms are provided and located opposed transversely to the cutting direction relative to an opening of the workpiece receiving contour.

25. The tool according to claim 19, wherein the plate has a fork-shape comprising two fork ends acting on the cutting edge outside of a cutting region of the cutting edge.

26. The tool according to claim 19, wherein the cutting edge has a guide, and the holding part has a counter guide, the guide of the cutting edge being engageable with the counter guide of the holding part.

27. The tool according to claim 19, further comprising a positioner configured to be fastened to the holding part for aligning workpieces of smaller diameters.

28. The tool according to claim 19, wherein the holding part defines a traversing surface which faces the cutting edge, wherein the cutting edge bears against the traversing surface and moves relative to the holding part.

29. The tool according to claim 28, wherein the workpiece receiving contour is U-shaped.

30. The tool according to claim 28, wherein the cutting edge is pivotable to an open position relative to the holding part for receiving the workpiece.

31. The tool according to claim 19, wherein the cutting edge has one or a plurality of cutting edge tips.

32. The tool according to claim 31, wherein the one or plurality of cutting edge tips are designed symmetrically relative to a center of the workpiece receiving contour.

33. The tool according to claim 31, wherein the one or plurality of the cutting edge tips include a wedge-shaped section.

34. The tool according to claim 31, wherein the cutting edge includes a convex contour.

35. The tool according to claim 19, further comprising a piston that includes the plate, wherein movement of the piston results in movement of the plate.

36. The tool according to claim 19, wherein the plate further seats within the channels of the holding part.

\* \* \* \* \*